US011954895B1

(12) United States Patent
Hu et al.

(10) Patent No.: US 11,954,895 B1
(45) Date of Patent: Apr. 9, 2024

(54) METHOD FOR AUTOMATICALLY IDENTIFYING SOUTH TROUGHS BY IMPROVED LAPLACE

(71) Applicant: Chengdu University of Information Technology, Chengdu (CN)

(72) Inventors: Wendong Hu, Chengdu (CN); Yanqiong Hao, Chengdu (CN); Hongping Shu, Chengdu (CN); Tiangui Xiao, Chengdu (CN); Yan Chen, Chengdu (CN); Ying Zhang, Chengdu (CN); Jian Shao, Chengdu (CN); Jianhong Gan, Chengdu (CN); Yaqiang Wang, Chengdu (CN); Fei Luo, Chengdu (CN); Huahong Li, Chengdu (CN); Balin Xu, Chengdu (CN); Qiyang Peng, Chengdu (CN); Juzhang Ren, Chengdu (CN); Chengchao Li, Chengdu (CN); Tao Zhang, Chengdu (CN); Xiaohang Wen, Chengdu (CN); Chao Wang, Chengdu (CN); Yongkai Zhang, Chengdu (CN); Wenjie Zhou, Chengdu (CN); Jingyi Tao, Chengdu (CN)

(73) Assignee: Chengdu University of Information Technology, Chengdu (CN)

(*) Notice: Subject to any disclaimer, the term of this patent is extended or adjusted under 35 U.S.C. 154(b) by 0 days.

(21) Appl. No.: 18/224,351

(22) Filed: Jul. 20, 2023

(30) Foreign Application Priority Data

Feb. 10, 2023 (CN) .......................... 202310091732.5

(51) Int. Cl.
*G06V 10/44* (2022.01)
*G01W 1/00* (2006.01)
(Continued)

(52) U.S. Cl.
CPC ............... *G06V 10/44* (2022.01); *G01W 1/00* (2013.01); *G06T 3/4007* (2013.01); *G06T 5/30* (2013.01); *G06V 10/462* (2022.01)

(58) Field of Classification Search
CPC ....... G06V 10/44; G06V 10/462; G01W 1/00; G06T 3/4007; G06T 5/30
See application file for complete search history.

(56) References Cited

U.S. PATENT DOCUMENTS

2016/0139282 A1* 5/2016 Dimitrov ............... G01V 1/302
703/2

OTHER PUBLICATIONS

Michael Kern, Tim Hewson, Filip Sadlo, Rudiger Westermann, and Marc Rautenhaus., "Robust Detection and Visualization of Jetstream Core Lines in Atmospheric Flow"., IEEE Transactions on Visualization and Computer Graphics, vol. 24, No. 1, Jan. 2018., pp. 893-902 (Year: 2018).*

* cited by examiner

Primary Examiner — Yoshihisa Ishizuka

(57) ABSTRACT

The present disclosure discloses a method for automatically identifying south troughs by improved Laplace and relates to the technical field of meteorology. The method includes the following steps: acquiring grid data of a geopotential height field; calculating a gradient field of the geopotential height field in an x direction; searching for a turning point where a gradient value turned from being negative to being positive, and cleaning the gradient field; calculating a divergence of the x direction to obtain an improved Laplacian numerical value L'; performing 0,1 binarization processing on the L' to obtain a black-and-white image and a plurality of targets of potential troughs, merging the black-and-white image and the plurality of targets of the potential troughs by expansion, (Continued)

recovering original scale through erosion, and selecting an effective target through an angle of direction of a contour and an axial ratio.

6 Claims, 21 Drawing Sheets

(51) Int. Cl.
*G06T 3/4007* (2024.01)
*G06T 5/30* (2006.01)
*G06V 10/46* (2022.01)

METHOD FOR AUTOMATICALLY IDENTIFYING SOUTH TROUGHS BY IMPROVED LAPLACE

CROSS-REFERENCE TO RELATED APPLICATION

This application claims priority from the Chinese patent application 202310091732.5 filed Feb. 10, 2023, the content of which is incorporated herein in the entirety by reference.

TECHNICAL FIELD

The present disclosure relates to the technical field of meteorology, and particularly relates to a method for automatically identifying south troughs by improved Laplace.

BACKGROUND

The sea-level air pressure is about 1000 hPa, and the air pressure from the ground to high altitude decreases gradually. The farther away from the ground is and the higher the altitude is, the lower the air pressure is. For example, the air pressure at a site about 3000 m above the average sea level surface decreases to 700 hPa, and the air pressure at a site about 5000 m above the average sea level surface decreases to 500 hPa. In considering the working effect of the gravity, the height with a certain air pressure is called as the geopotential height. On a barometric surface, the geopotential heights in places are different, so the barometric surface is not a pure plane in space but is uneven like a terrain. The geopotential height of the barometric surface can be represented by a binary function $H(x,y)$ in mathematics. FIG. 2 is a spatial schematic diagram of the barometric surface. A protruding position of the barometric surface in space corresponds to a higher geopotential height, and a depressed position of the barometric surface corresponds to a lower geopotential height.

The air temperature from ground to high altitude decreases persistently. If the atmosphere rises, water vapor in air approaches saturation point due to temperature drop and is congealed to water drops or ice crystals to form clouds and precipitation. In the Northern hemisphere, the south is close to the ocean and is high in air temperature, so there is much moist water vapor in the atmosphere, which is warm and wet air. There is less water vapor in the north, so the air is dry and cold.

The upper air of a mid and high latitude area in the Northern hemisphere prevails a westerly current, this area is called as a westerly belt. The vast majority of regions in China are located in the mid-latitude westerly belt. The westerly current usually fluctuates to form troughs and ridges shown in FIG. 3 and FIG. 4. The trough in the westerly current is called as westerly trough. In a weather map, a trough in the westerly belt often stretches from north to south.

In a high altitude isobaric synoptic chart, a narrow and long region of the westerly belt extending from the center to the south is the westerly trough shown in FIG. 3. As it is represented linear in the weather map, it is also called as a trough line. A southwest warm and wet air current is in front of the trough, i.e., the east side of the trough line, and a northwest dry and cold air current is on the back of the trough, i.e., the west side of the trough line. As cold and warm air is different in density, the warm air in front of the trough is lighter. Since the high altitude is colder due to rise of the air currents, water vapor in the air is congealed, so cloudy and rainy weather often happens in this region. The dry and cold air on the back of the trough sinks due to high density. As the lower layer is warmer, water drops and ice crystals are heated to be in vapor state, so this region has clear weather. Therefore, characteristics such as position and intensity of the trough line are of critical indicating significance to weather analysis and forecasting.

FIG. 3 and FIG. 4 show the trough line in the westerly belt on the 500 hPa barometric surface, wherein the numerical value represents the geopotential height, P1-4 show a positional relation of the points in the transverse direction (x direction), and P0 is a node of the trough line, with a unit of geopotential meter. FIG. 3 shows horizontal distribution of the geopotential heights near the trough line, wherein the left arrows show the dry and cold northwest air currents and the right arrows show the warm and wet southwest air currents. FIG. 4 is obtained by making a vertical section along a dotted line in FIG. 3, wherein the thick line is an intersecting line $F(x)$ between the vertical section and the barometric surface, the black arrows show gradient directions of the geopotential height, − and + are gradient symbols respectively, and the transverse thin line is a geopotential height value. The node P0 of the trough line in FIG. 4 has the following characteristics: its geopotential height is smaller than that of the points in adjacent domains on both sides and the gradients on both sides are on the contrary with the symbols (+ and −) turned from being negative to being positive.

Because of the huge terrain dynamic effect of the Qinghai-Tibet Plateau, a current of west wind passing through the Qinghai-Tibet Plateau is divided into south and north currents, and the south branch is called as the south trough. Its geographic position is between latitude 10-30° N and longitude 75-95° E. The south trough starts to emerge in the middle dekad (ten-day) of October and disappears in the middle dekad of June next year, which is an important weather system affecting south China. The affected regions include Yunnan, Guizhou, Tibet, Sichuan, Chongqing provinces and so forth. Matched with cold air, the south trough can result in cold and rainy weather in a large range of the southwest region in China, and different conditions such as position, water vapor delivery, low altitude jets and cold air intensity dominates the precipitation intensity. In addition to southwest China, the south trough drifts eastwards to bring heavy precipitation to large regions such as South China and East China.

The isobaric surface in space is uneven like the terrain. As shown in FIG. 5, the trough is a long and narrow linear region extending from a low value center to the south, so it is also called the trough line, which is represented as a line in a valley region in three-dimensional space. The geopotential height value at each point of the trough line is lower than that on the front and back sides. Viewed from gradient, the symbols on both sides are contrary in negative or in positive, so the directions of gradient are contrary; if there is water flowing along the geopotential height field, water drops flow downwards and are gathered through both sides, as shown in arrow heads in FIG. 5. The path passing through is the position of the trough line. In FIG. 5, the curve is the position of the trough line on the barometric surface in the three-dimensional space. FIG. 5 shows that in a topographic map, a brook is the lowest end between hillsides on both sides and is formed by the water drops traveling downhill. A line is formed by a series of points, so is the trough line. The trough line is formed by nodes (node P0 in FIG. 4) on the trough line. The nodes are convergent points on both sides of the valley. By using a way of finding the brook in the topographic map as reference, the south trough can be identified.

At a certain point, the increment of the physical quantity in a certain special direction is the directional gradient of the point. With respect to a unary function in FIG. 4, the gradient is the slope of the curve. As far as the geopotential height field H is concerned, it varies with geographical coordinates x and y. The expression of H is a two-dimensional function H(x,y), and the gradient G(x,y) thereof is a vector, which can be decomposed into two perpendicular components in x and y directions, as shown in FIGS. 6 and 7. FIG. 6 represents a perpendicular section taken through a point A on the barometric surface in the x and y directions respectively, as shown in FIG. 7. The gradient of the point is calculated, where the vector $\overrightarrow{AB''}$ is the gradient of the point A in the y direction, the vector $\overrightarrow{AB'}$ is the gradient of the point A in the x direction, and the sum $\overrightarrow{AB}$ of the two components is the gradient vector of the point A.

The gradient of a binary scalar field is a vector field. With respective to the binary function, i.e., the geopotential height field H(x,y) in two-dimensional distribution, the gradient G(x,y) thereof can be represented as:

$$G(x, y) = \Delta H = \frac{\partial H}{\partial x}\vec{i} + \frac{\partial H}{\partial y}\vec{j}$$

the gradient is pointed from low value to high value, where $$\Delta = \frac{\partial}{\partial x}\vec{i} + \frac{\partial}{\partial y}\vec{j}$$

represents the Hamiltonian operator.

However, the gradient only indicates the flowing direction of the water drops rather than indicating whereabouts of the water drops converged as the brook. Where the water drops flowing down are converged can be reflected by divergence.

Divergence is a physical quantity describing the degree of convergence or divergence near a certain point in the vector field, which is a scalar quantity. As far as a certain point is concerned, if the divergence value is greater than 0, it represents that the point is a source point, i.e., it diverges from the point, as shown in FIG. 8; if the divergence value is less than 0, it represents that the point is the converging point, indicating collection to the point, as shown in FIG. 9; and if the divergence value is equal to 0, there is neither convergence nor divergence in a small region around the point.

For a two-dimensional vector field, by taking the gradient G(x,y) as an example, the divergence D thereof can be represented as:

$$D = \nabla \cdot G(x, y) = \frac{\partial G(x, y)}{\partial x} + \frac{\partial G(x, y)}{\partial y}$$

By calculating the divergence of the vector field, whether and where the vector field is diverged or converged can be analyzed, and the intensity thereof can be determined.

A mathematical tool for the operations above is Laplace, with a symbol of $\nabla^2$, named after the French mathematicians La Place, which is mostly used for analyzing the characteristics of a function in multi-dimensional space. The divergence D of the gradient G for a function is Laplace $\nabla^2$ operation, which is marked as L. For the geopotential height H(x,y), the formula for calculating the gradient is substituted into the formula for calculating the divergence, and the Laplace of the geopotential height is represented as:

$$L = \nabla^2 H = \nabla \cdot G(x, y) = \nabla \cdot \nabla H = \frac{\partial^2 H}{\partial x^2} + \frac{\partial^2 H}{\partial y^2}$$

Specifically speaking, the gradient of the geopotential height H(x,y) is solved: by means of the equation for calculating the gradient, the gradients of the geopotential heights in the x and y directions are respectively marked as $G_x(x,y)$ and $G_y(x,y)$:

$$\begin{cases} G_x(x, y) = \frac{\partial H}{\partial x} \\ G_y(x, y) = \frac{\partial H}{\partial y} \end{cases}$$

The divergence is calculated for the above gradient, so the divergence $D_x(x,y)$ in the x direction and the $D_y(x,y)$ in the y direction are obtained:

$$\begin{cases} D_x(x, y) = \frac{\partial G_x(x, y)}{\partial x} = \frac{\partial^2 H}{\partial x^2} \\ D_y(x, y) = \frac{\partial G_y(x, y)}{\partial y} = \frac{\partial^2 H}{\partial y^2} \end{cases}$$

In this case, the D(x,y) of the field after the divergence operation for the gradient is the sum of $D_x(x,y)$ and $D_y(x,y)$ in the x and y directions, i.e., the Laplace L:

$$L = D(x, y) = D_x(x, y) + D_y(x, y) = \frac{\partial^2 H}{\partial x^2} + \frac{\partial^2 H}{\partial y^2}$$

In an actual operation, the Laplace L is calculated by way of replacing partial differential with difference:

$$L = \frac{\Delta G_x(x, y)}{\Delta x} + \frac{\Delta G_y(x, y)}{\Delta y} = \frac{\Delta\left(\frac{\Delta H}{\Delta x}\right)}{\Delta x} + \frac{\Delta\left(\frac{\Delta H}{\Delta y}\right)}{\Delta y}$$

where L is the Laplacian numerical value calculated for the geopotential height field H(x,y) by means of a difference method.

It can be known from the above analysis that to search for the south trough in the geopotential height field essentially refers to calculating the Laplacian numerical value of the geopotential height field H, i.e., searching for the gradient of the geopotential height field by calculating the gradient first, which is equivalent to acquiring the flowing direction of the water drops; and then searching for a low point of the geopotential height by calculating the divergence, which is equivalent to determining the converging position of the water drops, i.e., the nodes of the trough line. A series of such nodes can be connected in series to find the trough line.

The south trough is an important weather system affecting south China, which often directly affects regions such as Yunnan, Sichuan, Guizhou and Guangxi provinces in China. In the winter half year, when the cloud systems of the south trough drift eastwards to massive regions in the south of the Yangtze river such as Hunan and Jiangxi provinces with the warm and humid air current of southwest wind, it will bring precipitation to the regions, which is one of the important precipitation weather systems in South China. The south trough features long active time and wide influence region. To analyze the south trough accurately is of great significance for weather forecast, prevention and mitigation of natural disasters and so forth. However, up to now, operational meteorologys ervice is limited to manual analysis of forecasters all the time, which is complicated in process, low in efficiency, differs from one to another, and is easy to judge mistakenly.

SUMMARY

To overcome the above defects in the prior art, the present disclosure provides a method for automatically identifying south troughs by improved Laplace, which solves the problem of erroneous judgment due to complicated process and low efficiency of manually analyzing the south trough.

To achieve the above objective of the present disclosure, the technical solution adopted by the present disclosure is as follows: a method for automatically identifying south troughs by improved Laplace, including the following steps:

S1: acquiring grid data H of a geopotential height field, wherein H [i, j] represents an element in the $i^{th}$ row and $j^{th}$ column in the grid data, H [i, j+1] represents a grid point on a right side of the H [i, j], Δx represents a distance between the two points: H [i, j] and H [i, j+1]; H [i, j+1] represents a grid point on a lower side of the H [i, j], and Δy represents a distance between the two points: H [i, j] and H [i+1, j];

S2: calculating a gradient field of the geopotential height field in an x direction;

S3: searching for a turning point where a gradient value turned from being negative to being positive, and cleaning the gradient field to obtain the cleaned gradient field;

S4: calculating a divergence of the x direction for the cleaned gradient field to obtain improved Laplacian numerical value L';

S5: performing 0,1 binarization processing on the L' to obtain a black-and-white image and a plurality of targets of potential troughs;

S6: merging the plurality targets of the potential troughs in the black-and-white image by means of an expansion algorithm, recovering the expanded image to original scale by means of an erosion algorithm, and identifying a contour through the image to obtain a merged target contour;

S7: calculating a pointing angle of the contour and a ratio of major and minor axes of the contour for the merged target contour, and searching for an effective target;

S8: extracting endpoints of east, west, south and north for the effective target, and adjusting the form of the trough line corresponding to the effective target to obtain the adjusted trough line; and S9: fitting the adjusted trough line to obtain the south trough.

The present disclosure has the following beneficial effects: by automatically identifying the south trough, the present disclosure can improve the efficiency and normalization of weather forecast and reduce misjudgment caused by human factors greatly, and is of extreme significance to timely make correct judgment on weather situation and improve the forecasting capacity.

DESCRIPTION OF THE EMBODIMENTS

Specific embodiments of the present disclosure will be described below, to make those skilled in the art better understand the present disclosure. It should be clear that the present disclosure is not limited to the scope of the specific implementation modes. For those of ordinary skill in the art, variations within the spirit and scope of the present disclosure defined and specified by the appended claims are apparent, and all innovation and creation utilizing the concept of the present disclosure shall be under protection.

Figure 1:
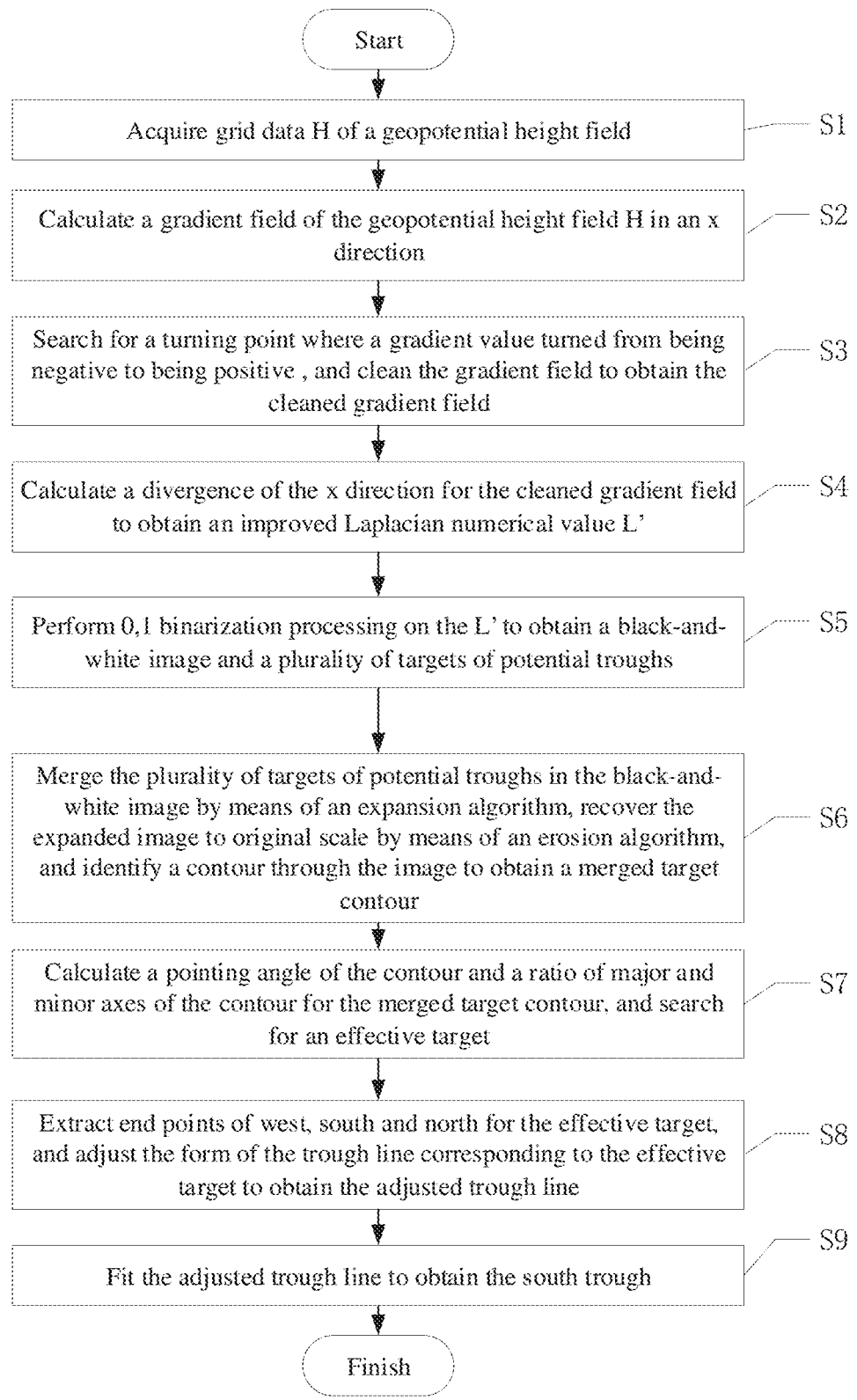
FIG. 1 is a flow frame diagram of the present disclosure.
Figure 2:
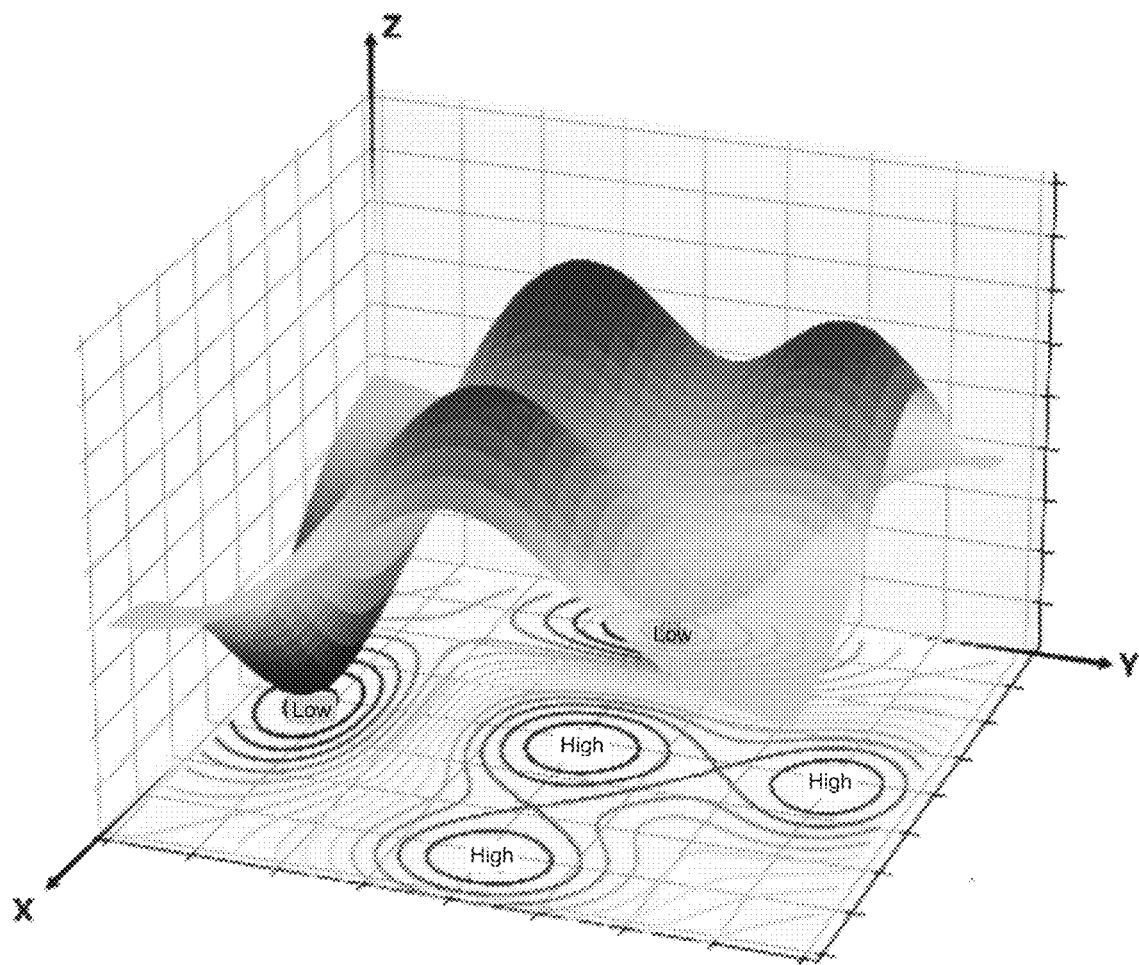
FIG. 2 is a spatial schematic diagram of an isobaric surface.
Figure 3:
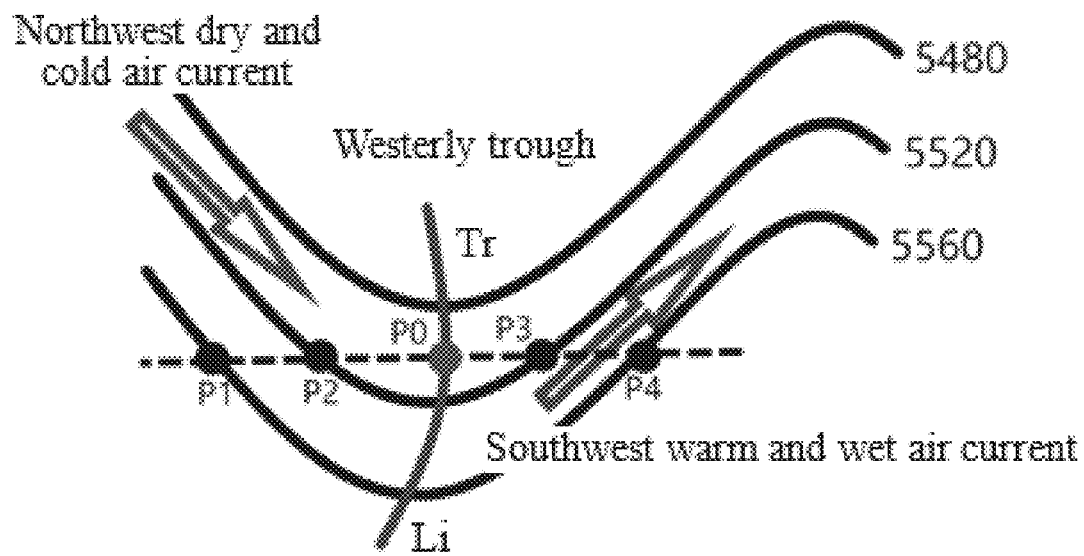
FIG. 3 is a horizontal distribution diagram of geopotential heights near a trough line.
Figure 4:
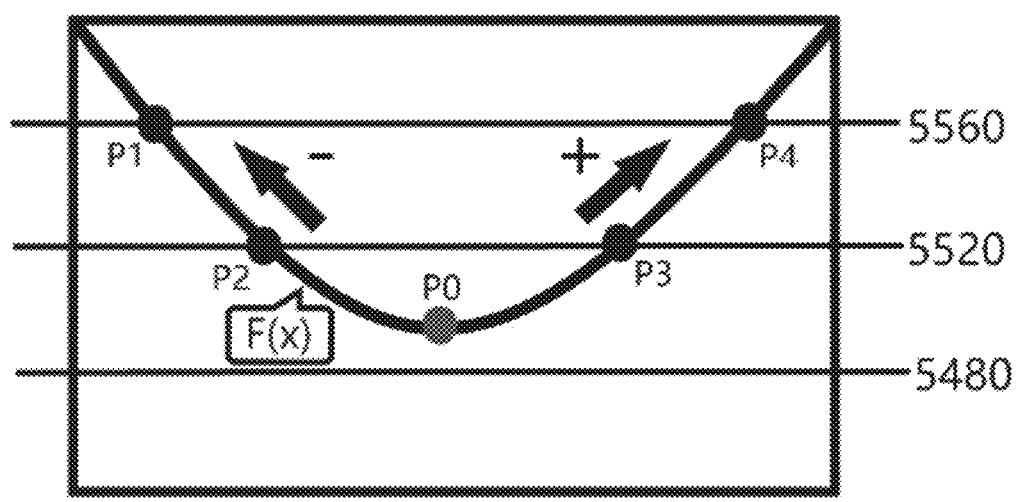
FIG. 4 is a vertical section distribution diagram of geopotential heights near the trough line.
Figure 5:
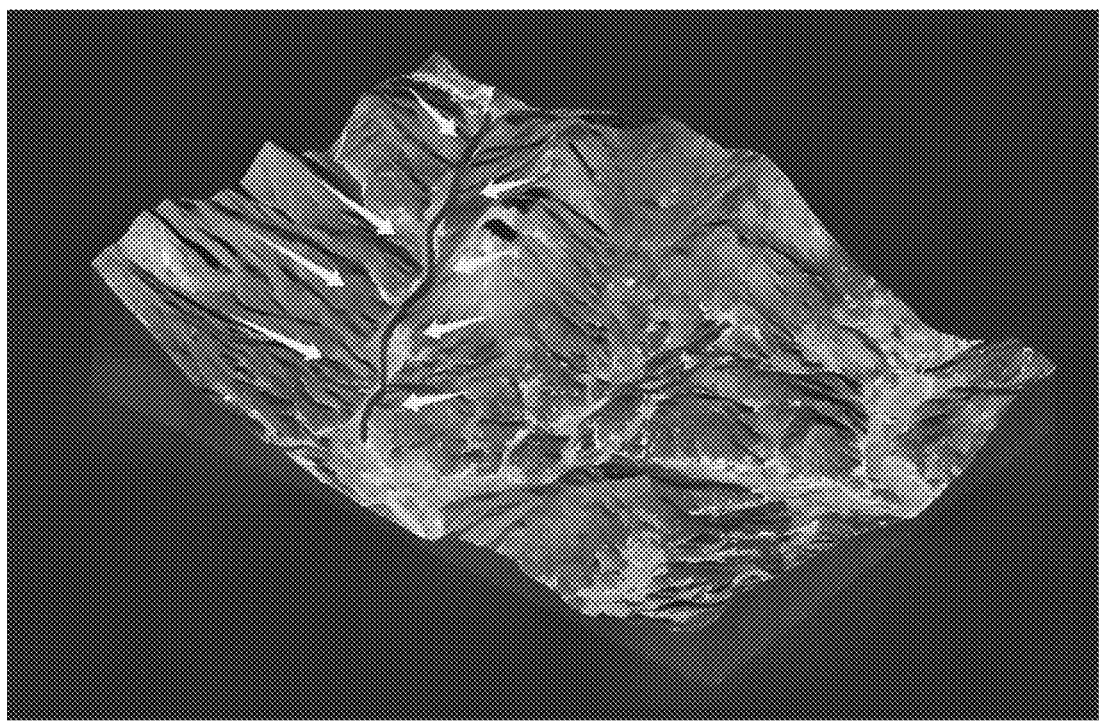
FIG. 5 is a three-dimensional spatial schematic diagram of the trough line.
Figure 6:
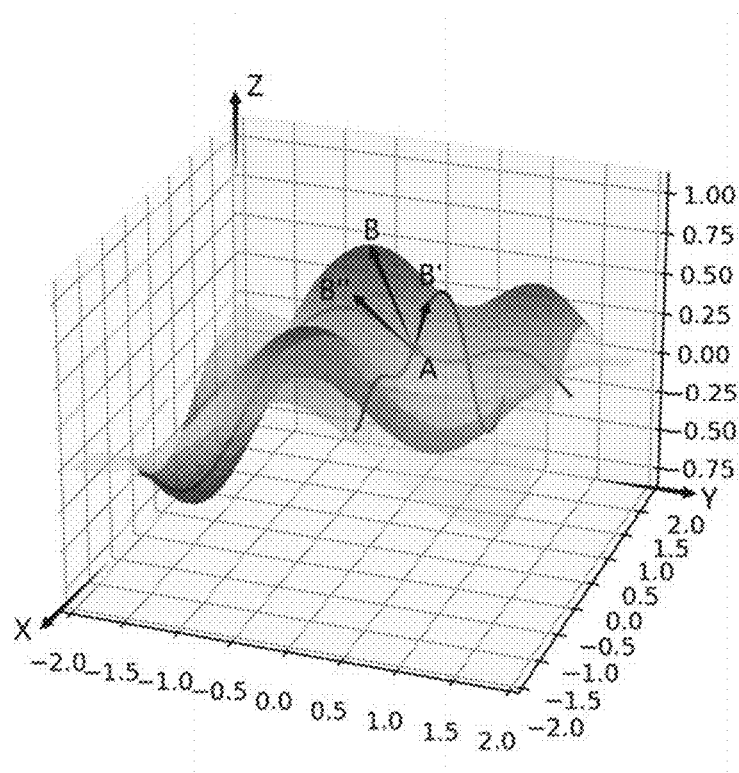
FIG. 6 is a gradient schematic diagram in space.
Figure 7:
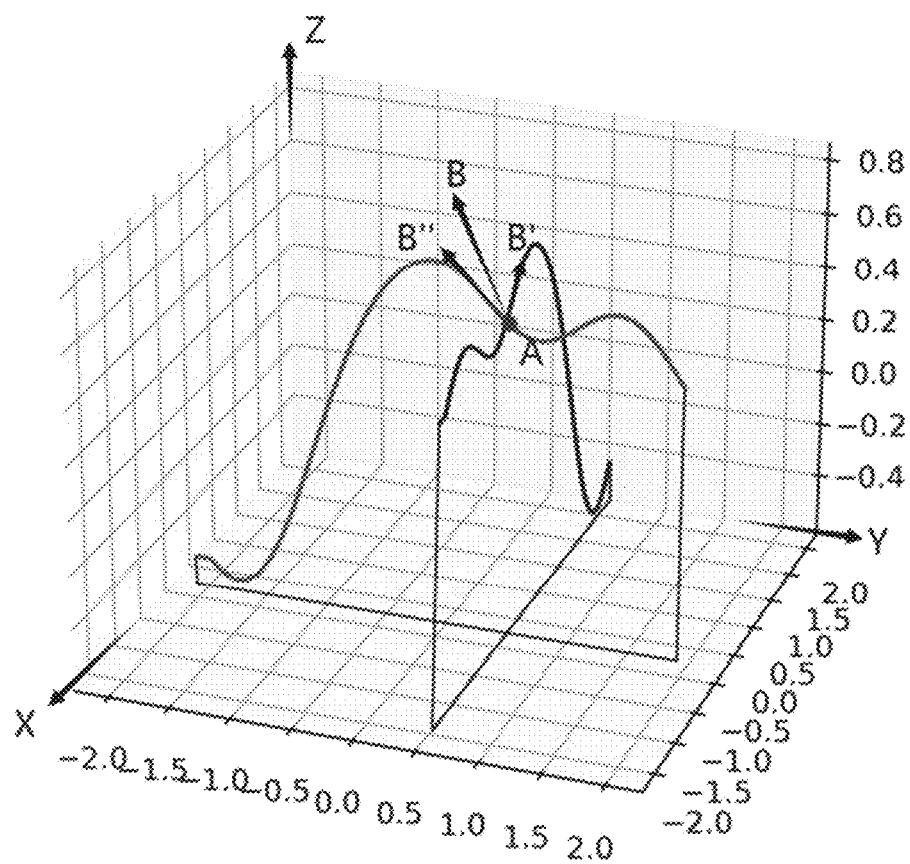
FIG. 7 is a schematic diagram of a gradient vertical section in space.
Figure 8:
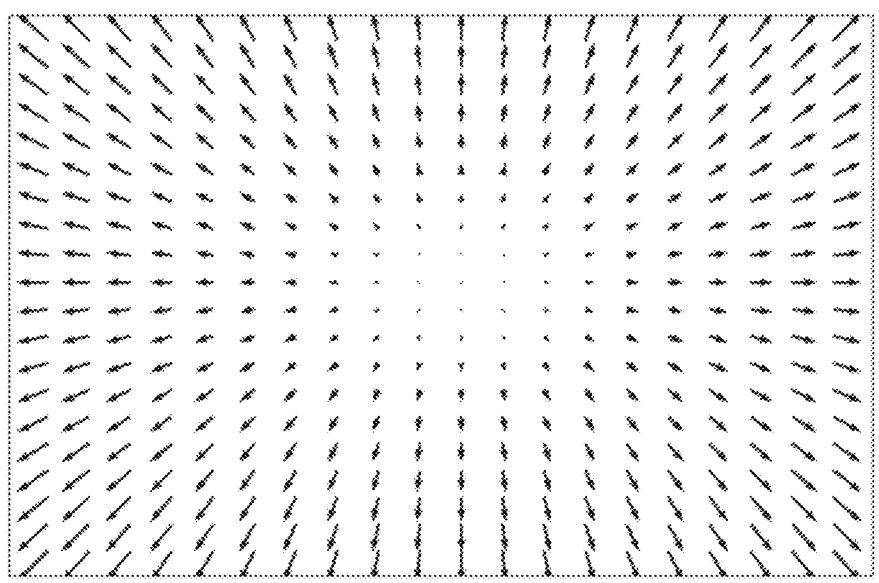
FIG. 8 is a schematic diagram of divergence.
Figure 9:
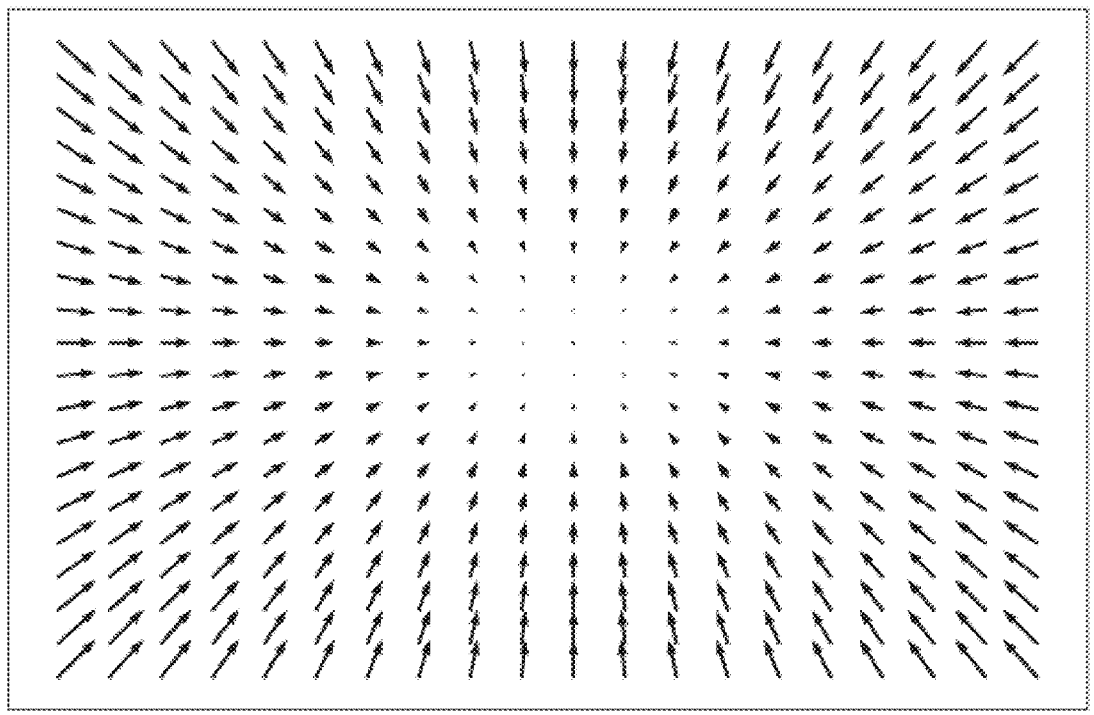
FIG. 9 is a schematic diagram of convergence.

As shown in FIG. 1, a method for automatically identifying south troughs by improved Laplace, including the following steps:

S1: grid data H of a geopotential height field is acquired, wherein H [i, j] represents an element in the $i^{th}$ row and $j^{th}$ column in the grid data, H [i, j+1] represents a grid point on a right side of the H [i, j], Δx represents a distance between the two points: H [i, j] and H [i, j+1]; H [i, j+1] represents a grid point on a lower side of the H [i, j], and Δy represents a distance between the two points: H [i, j] and H [i+1, j];

S2: a gradient field of the geopotential height field in an x direction is calculated;

S3: a turning point where a gradient value turned from being negative to being positive is searched, and the gradient field is cleaned to obtain the cleaned gradient field;

S4: a divergence of the x direction for the cleaned gradient field is calculated to obtain an improved Laplacian numerical value L';

S5: 0,1 binarization processing is performed on the L' to obtain a black-and-white image and a plurality of targets of a potential trough line;

S6: the plurality of targets of the potential troughs in the black-and-white image are merged by means of an expansion algorithm, the expanded image is recovered to original scale by means of an erosion algorithm, and a contour is identified through the image to obtain a merged target contour;

S7: a pointing angle of the contour and a ratio of major and minor axes of the contour for the merged target contour are calculated, and an effective target is searched;

S8: endpoints of east, west, south and north are extracted for the effective target, and the form of the trough line corresponding to the effective target is adjusted to obtain the adjusted trough line; and S9: the adjusted trough line is fit to obtain the south trough.

In the present disclosure, to search for the trough line, i.e., determine the node position thereof, can includes the following steps:

First, a transverse (an x coordinate is defined in east direction) position of the node of the trough line at a certain altitude (south and north direction is given, i.e., the y coordinate is determined in north direction), i.e., the transverse converging position of the water drops is determined by hillside distribution.

First of all, the direction of the water drops is determined, which is decided by the slope, i.e., from high altitude to low altitude. The slope is the reverse direction of the gradient in mathematical analysis, the gradient of the geopotential height field is calculated, and the direction of the node of the south trough can be found in its reverse direction.

Second, after the direction is determined, the specific position of the node of the trough line has to be specified. Viewed from the hillsides on both sides of the brook, it is located at the converging position between the hillsides on both sides. Mathematically, if the divergence at the position is a negative value, convergence happens at this position.

In addition, the converging position calculated by divergence is often not a single point but a slice area, and it is not usually at the exact position with the maximum numerical value. It can be known from analysis that both sides of the convergent point are uphills opposite in direction. Therefore, it is necessary to add determination conditions for the slope at the two positions to obtain the specific position of a node of the trough line. The specific determination condition is as follows: the numerical value of the gradient is turned from being negative to being positive from west to east.

Thus, a specific coordinate (x,y) of a node P0 of the trough line can be acquired.

Second, the above process is repeated on the altitude y at another position in a target region to calculate a coordinate value x corresponding to another node of the trough line, so that a series of nodes of the trough line can be obtained. The nodes are connected in sequence to obtain a south trough line.

In the geopotential height field, the south trough means that at the brook of the valley, if there are water drops moving in the geopotential height field, the converging position of the water drops flowing downwards from hillsides on both sides is the position of the node of the trough line. On the hillside on each side, the water drops flow downwards in the reverse direction of the gradient. The water drops will finally stay at the lowest position of the geopotential height, i.e., the node of the south trough.

By analyzing the whole isobaric surface, a plurality of terrace cut slices can be taken in the south and north direction, i.e., different altitude y coordinates, to obtain many nodes of the south trough.

These lowest points are the positions where the water flows converge, i.e., the positions with divergence less than 0. As long as the divergence of the gradient, i.e., the specific value of Laplace L, is found, and so the position of the trough can be identified. The essence to search for the south trough refers to searching for the south and north track of the brook under a gravity field from high to low in a mountainous region with the geopotential height field.

The specific implementation mode of S2 is as follows: according to the formula, $$G_x[i, j] = \frac{\Delta H}{\Delta x} = \frac{H[i, j+1] - H[i, j]}{\Delta x}$$

the gradient field $G_x$ in the x direction is acquired, wherein ΔH represents an altitude difference of the geopotential height field at the $i^{th}$ row and $j^{th}$ column, Δx represents the distance between the two points in the x direction; and $G_x$[i, j] represents a gradient value in the x direction in the $i^{th}$ row and $j^{th}$ column in the grid data;

The specific implementation mode of S3 is as follows:

S3-1: the turning point where the gradient value turned from being negative to being positive is determined according to the gradient field; and S3-2: datum of $G_x$<0 is reserved for the point on the left side of the positive and negative turning point of the gradient value; the gradient values of the rest points are assigned to 0; and the cleaned gradient field $G'_x$ is obtained, with the expression as follows:

$$G'_x[i, j] = \begin{cases} G_x[i, j](G_x[i, j] < 0 \wedge F_x[i, j+1] > 0) \\ 0 \end{cases}.$$

The specific implementation mode of S4 is as follows:
as far as the south trough is concerned, it extends from north to south. Variation of the Laplacian numerical value in the x direction can completely reflect the position where the lowest points of the geopotential height are converged in the east and west direction, so as to determine the x coordinate of the node of the south trough. The Laplacian numerical value in the y direction reflects the y coordinate in the y direction, which has no contribution to search for the south trough. Therefore, to improve the efficiency of identifying the south trough, improvements are made below: only Laplace in the x direction is processed, while Laplace in the y direction is omitted, and the gradient and the divergence of the geopotential height H are calculated easily.

according to the formula, $$L' = \frac{\Delta G'_x}{\Delta x} = \frac{G'_x[i, j+1] - G'_x[i, j]}{\Delta x}$$

the improved Laplacian numerical value L' is obtained, wherein $G'_x[i, j+1]$ represents grid data of a point on the right side of $G'_x[i, j]$ in the cleaned gradient field.

The specific implementation mode of S6 is as follows:

S6-1: according to the formula, $$Y_1 = A \oplus B = \{x | B(x) \cap A \neq \emptyset\}$$

the black-and-white image is expanded to merge the plurality of targets so as to obtain the expanded image Y1, wherein B represents a convolution mask image, A represents an original image, and x represents an element point in the image; translating the image B according to the element point B, wherein a set of the obtained points is marked as B(x); B(x) represents a mobile structural element in an image A; ⊕ represents an expansion operation; $Y_1$ represents a set formed by points which make intersection of B and A non-empty after translating the structural element B in a result of the expansion operation; and ∅ represents a null set;

S6-2: according to the formula, $$Y_2 = Y_1 ! B = \{y | B(y) \in Y\}$$

the expanded image is eroded to recover the original dimension of the target, so as to obtain an eroded image $Y_2$, wherein ! represents erosion operation, and y represents the element point in the expanded image; and translating the image B according to the element point y, wherein a set of the obtained points is marked as B(y); and $Y_2$ represents a set formed by all points which make B included in $Y_1$ after translating the structural element B in a result of the erosion operation; and S6-3: S6-1 to S6-2 are repeated on the black-and-white image for 30 times and identifying the contour of the expanded and eroded image to obtain a merged target;

The specific implementation mode of S7 is as follows:

S7-1: a rectangular coordinate system is established at a central point of an inscribed ellipse of the merged contour, wherein the angle between the major axis of the inscribed ellipse of the contour and the x-axis is the target angle of direction, and the ratio of the length of the major axis to that of the minor axis of the inscribed ellipse of the contour is the ratio of the major and minor axes;

S7-2: contours with the angle of direction being less than 900, and the ratio of the major and minor axes of the inscribed ellipse being greater than 2 are reserved in all the merged contours as targets;

S7-3: if the expansion and erosion times reach 100 times, it is proceeded to S7-4; otherwise, expansion times are increased by 5 times and it is proceeded to S6;

S7-4: if the number of the effective targets is 0, it is indicated that there is no south trough in the geopotential height field, and this program stops; otherwise, it is proceeded to S7-5; and S7-5: all current targets are acquired.

The specific implementation mode of S8 is as follows:

S8-1: the northernmost point P and the southernmost point Q in all the target endpoints are connected to get a midpoint M;

S8-2: a horizontal line is made through the midpoint M, and a point N on a right side of the point M on the horizontal line, i.e., in an operating front of the trough line is taken; and S8-3: a distance |MN| between the point M and the point N is let to be ⅕ of a distance |PQ| between the point P and the point Q to obtain the optimal form of the target trough line.

The specific implementation mode of S9 is as follows:

S9-1: the points N and P and the points N and Q are respectively connected for the adjusted trough line with straight lines; and S9-2: Bezier interpolation is performed on each straight line, and the straight line connecting the points is replaced with a smooth curve to form a smooth and consecutive curve, i.e., the south trough.

Figure 10:
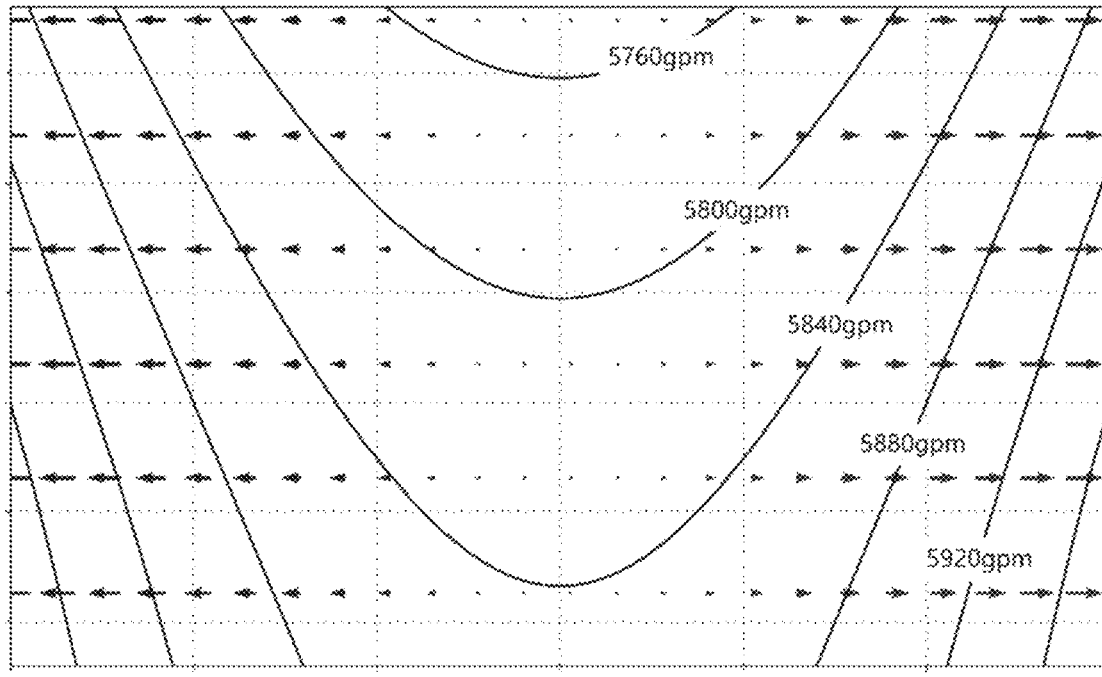
FIG. 10 is a schematic diagram of isolines of a geopotential height field.

As shown in FIG. 10, the black solid line represents the isolines of the geopotential height filed, with the arrows pointed from low value to high value of the geopotential height; the arrows pointed to the left side represents that the gradient value of the points have negative values, and the arrows pointed to the right side represent that the gradient values of the points are positive values.

Figure 11:
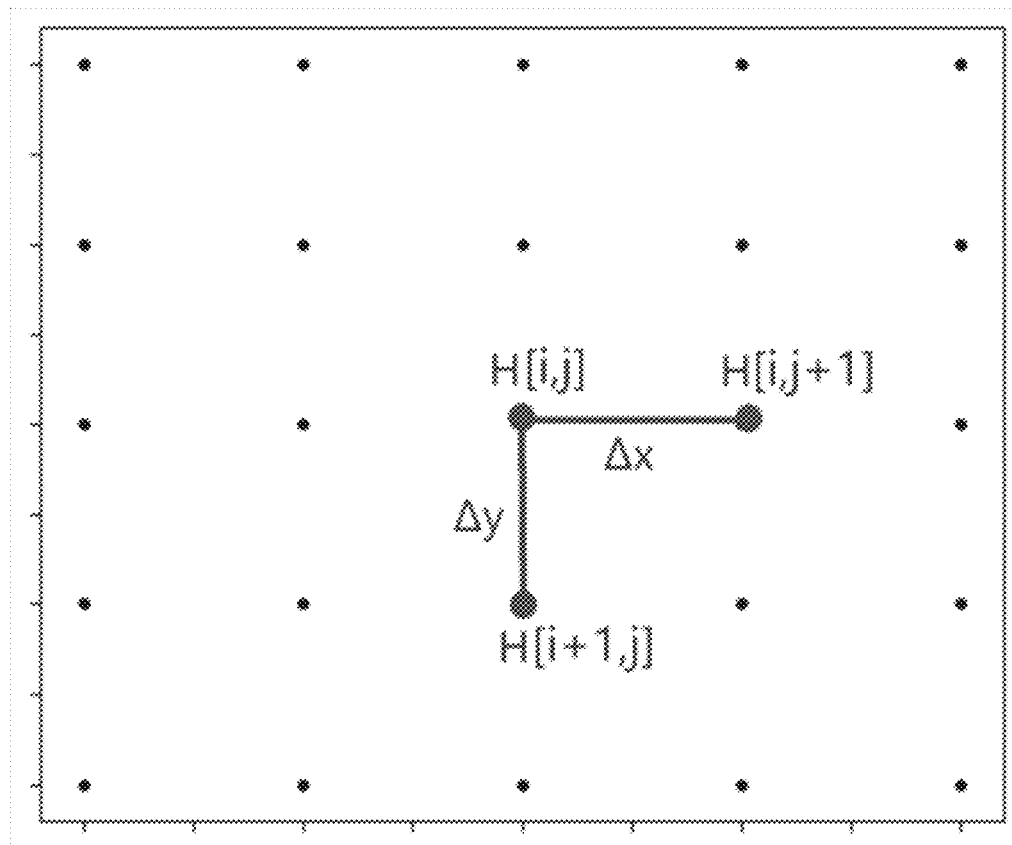
FIG. 11 is a schematic diagram of grid positions.
Figure 12:
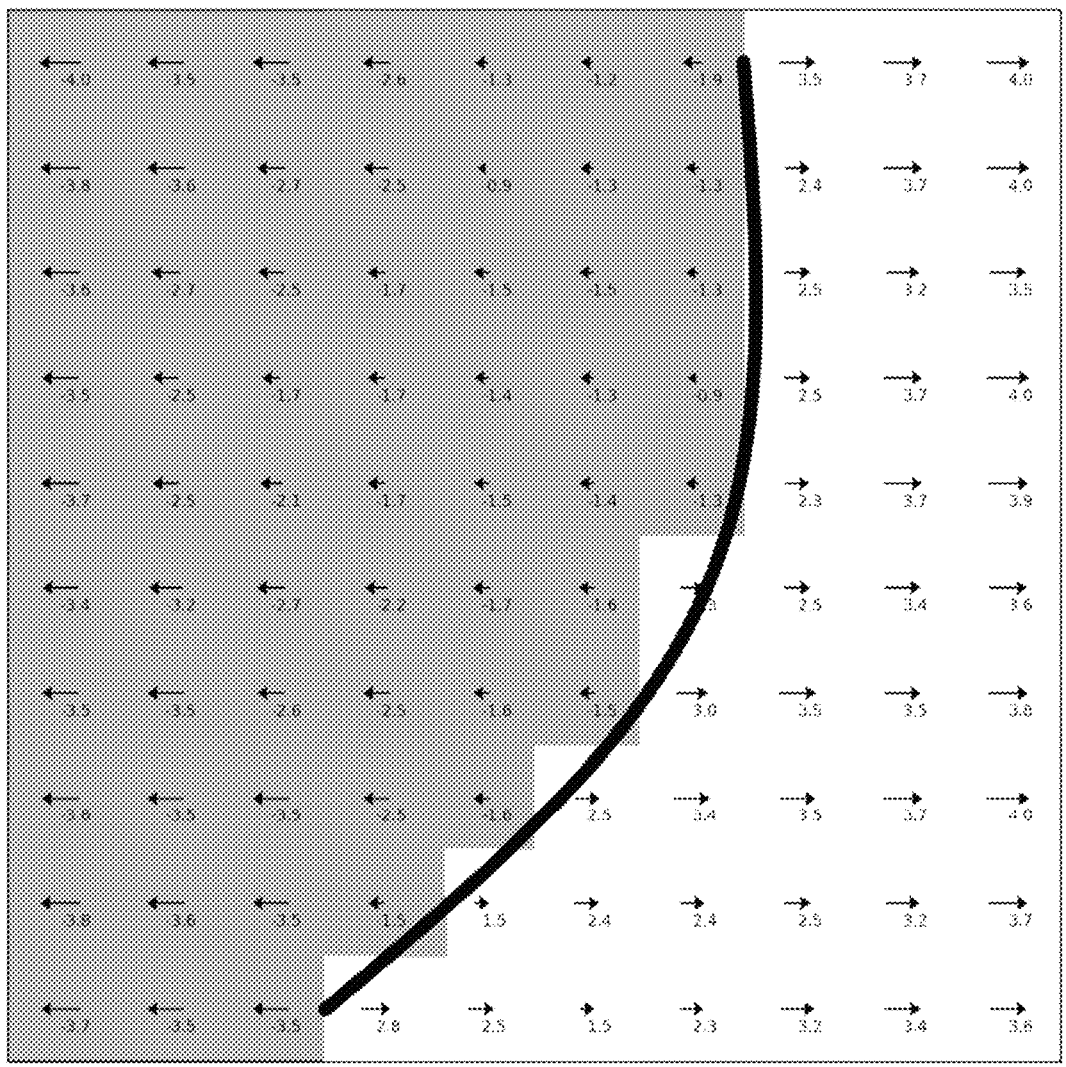
FIG. 12 is a schematic diagram of data before cleaning.
Figure 13:
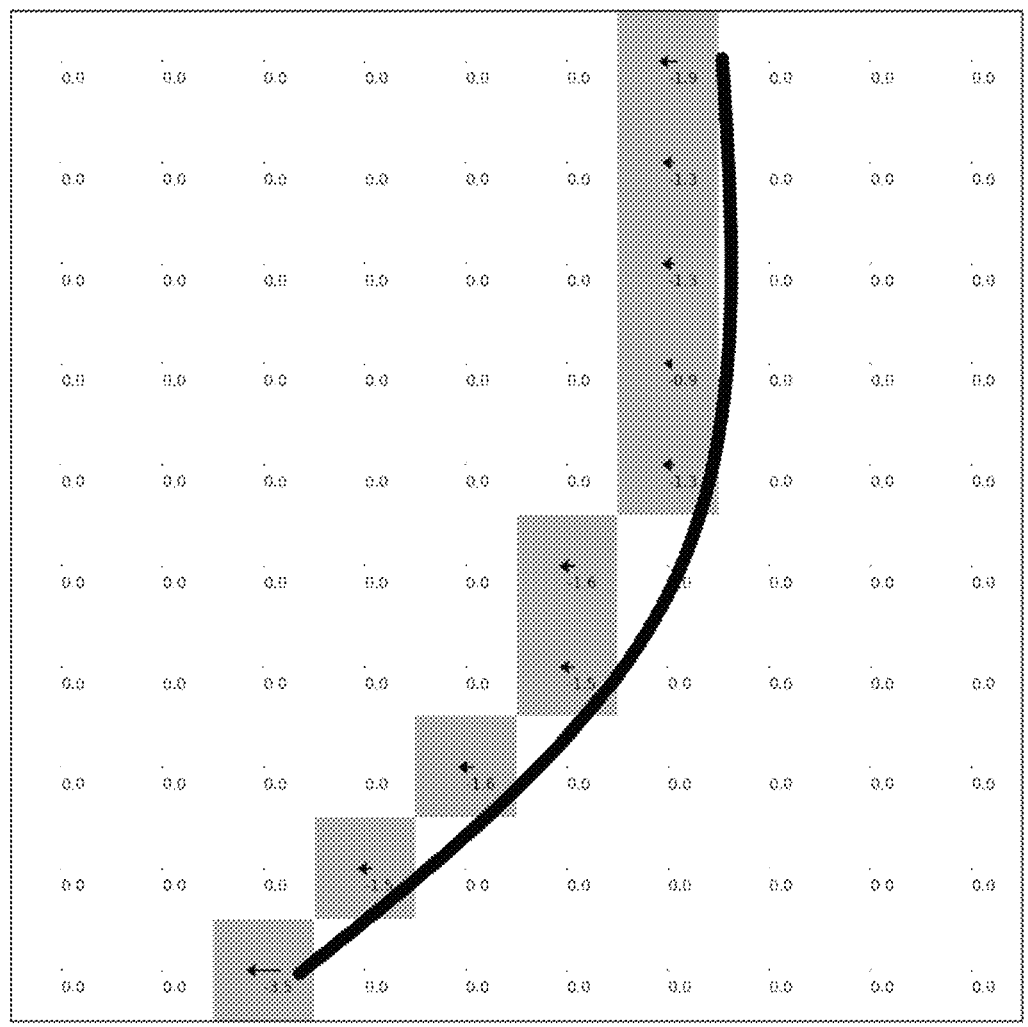
FIG. 13 is a schematic diagram of data after cleaning.

As shown in FIG. 11, H [i, j] represents an element in the $i^{th}$ row and $j^{th}$ column in the grid data, H [I, j+1] represents a grid point on a right side of the H [i, j], $\Delta x$ represents a distance between the two points: H [i, j] and H [i, j+1]; H [i, j+1] represents a grid point on a lower side of the H [i, j], and $\Delta y$ represents a distance between the two points: H [i, j] and H [i+1, j]. As shown in FIG. 12 and FIG. 13, the specific implementation mode of S3 is as follows:

S3-1: the turning point where the gradient value turned from being negative to being positive is determined according to the gradient field; and S3-2: datum of $G_x < 0$ is reserved for the point on the left side of the positive and negative turning point of the gradient value; the gradient values of the rest points are assigned to 0; and the cleaned gradient field $G'_x$ is obtained, with the expression as follows:

$$G'_x[i, j] = \begin{cases} G_x[i, j] (G_x[i, j] < 0 \wedge G_x[i, j+1] > 0) \\ 0 \end{cases}.$$

After the step is finished, there are only two kinds of data in the cleaned gradient field $G'_x$: I, the point on the left side of the positive and negative turning point of the gradient value, with the numerical value <0; and II, the rest of points, assigned to zero. FIG. 12 is a schematic diagram of data before cleaning; and FIG. 13 is a schematic diagram of data after cleaning.

Figure 14:
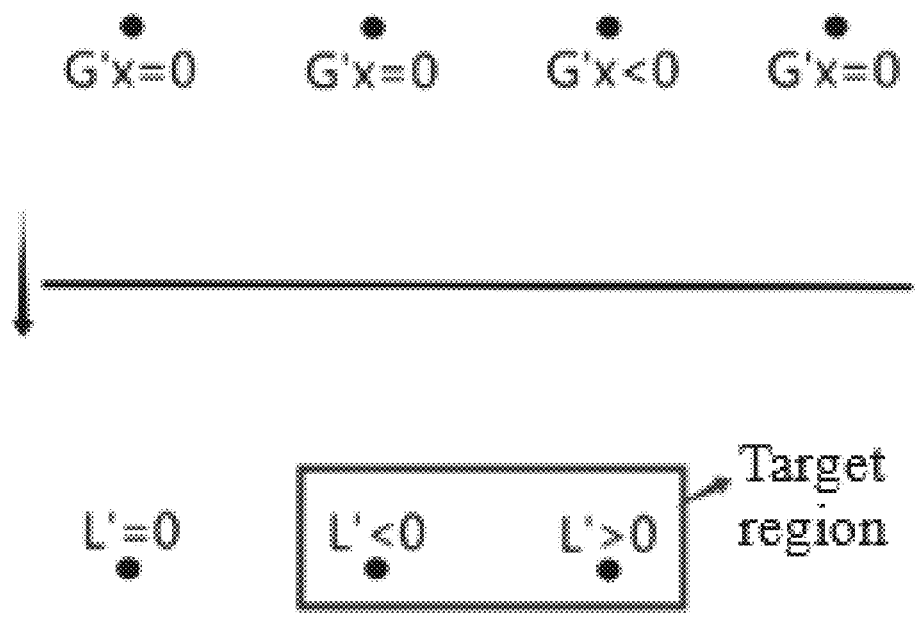
FIG. 14 is a schematic diagram of characteristics of improved Laplacian numerical values.

As shown in FIG. 14, the value of the improved Laplacian numerical value L' in the target region where the trough line may exist is L' #0 and the value in other regions is L'=0.

Figure 15:
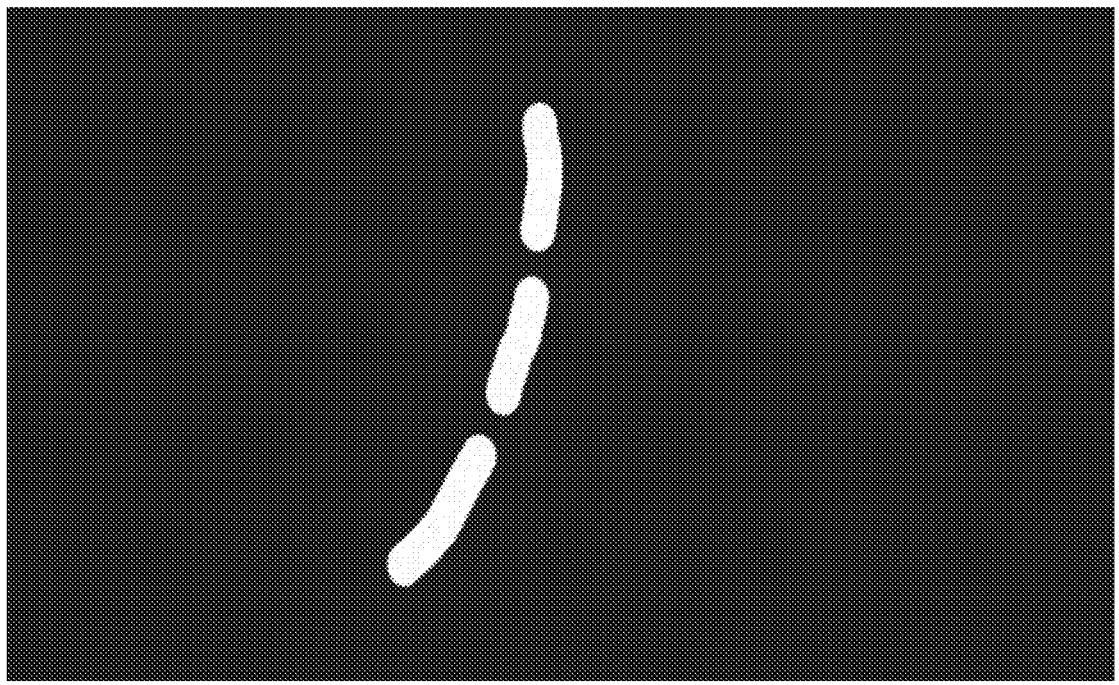
FIG. 15 is a white-and-black schematic diagram of improved Laplace L'.

As shown in FIG. 15, the specific implementation mode of S5 is as follows:
a brightness of a region where the improved Laplacian numerical value L' is not equal to 0 is assigned to 255 and the brightness of other regions to 0, wherein the value of the improved Laplacian numerical value L' in a target region where the trough line may exist is L'≠0 and the value in other regions is L'=0.

According to a range of activity of the south trough, an analysis area of L' is defined between 10°-30° N and 75°-95° E.

Figure 16:
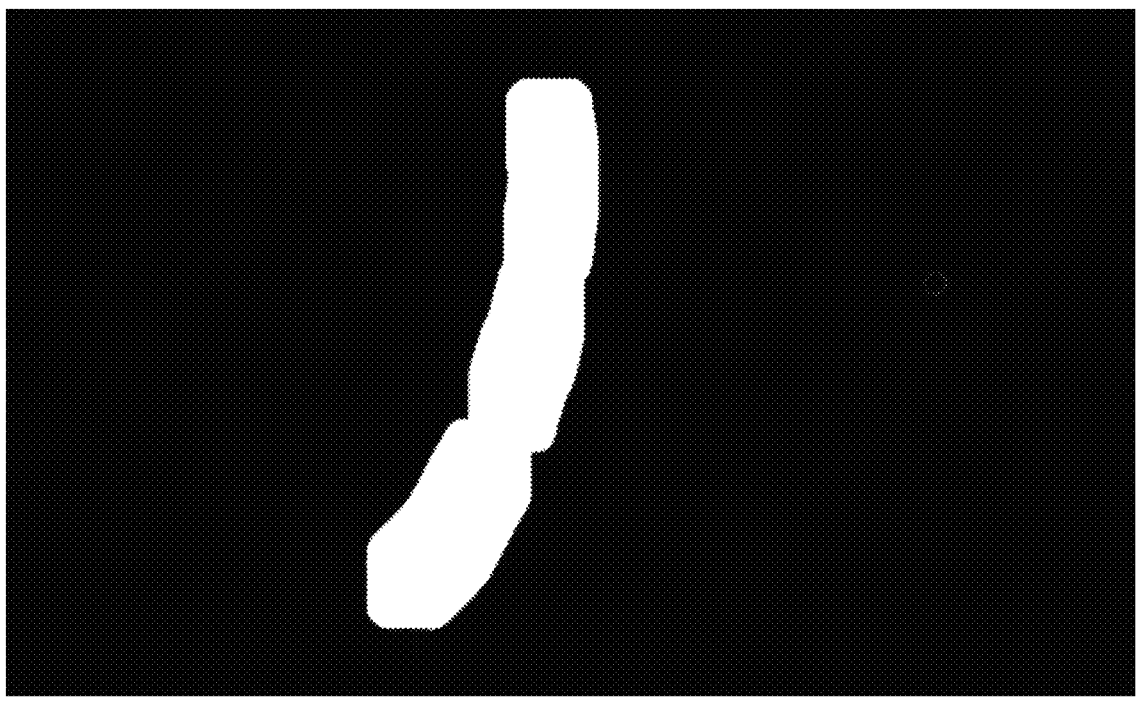
FIG. 16 is an effect diagram after expansion.
Figure 17:
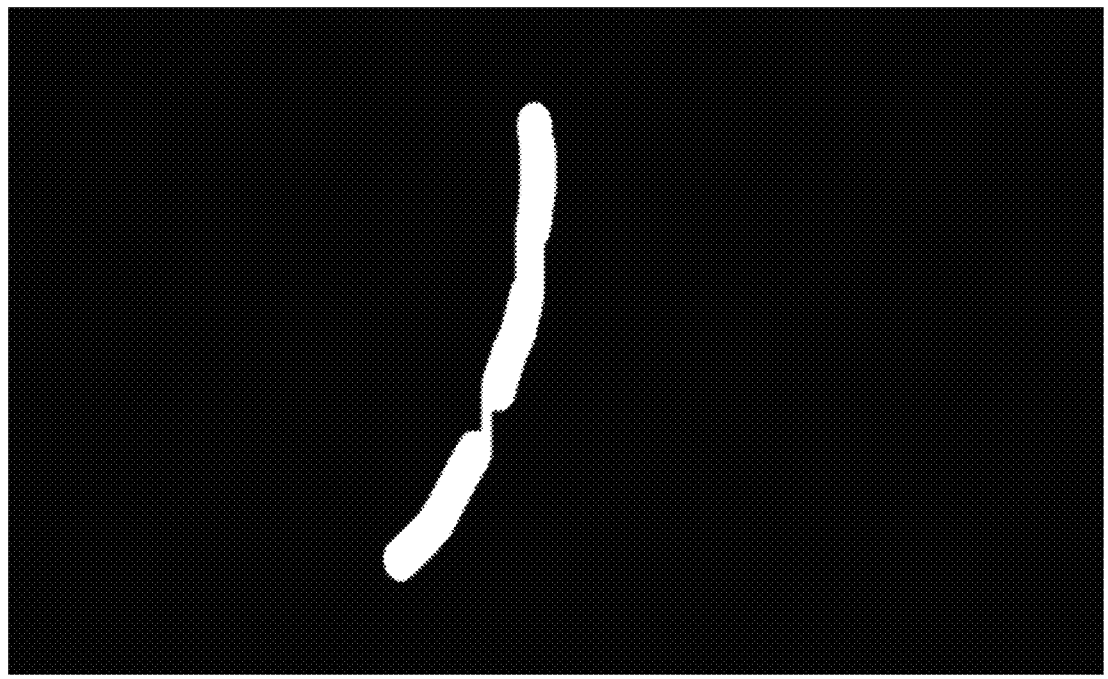
FIG. 17 is an effect diagram of expanded image after erosion.

As shown in FIG. 16 and FIG. 17, the white-and-black image is expanded to fuse the plurality of targets as a whole. Expansion and erosion are performed on the white highlighted target portion, i.e., the region with the brightness value being 255. The gray value of pixels inside the target is 255 and the gray value of background pixels out of the target is 0. During expansion, the pixel values of the background outside the target adjacent to the target are assigned to 255 again, so that the target is expanded. On the contrary, during erosion, the pixels of the background inside the target adjacent to the target are assigned to 0 again, so that the target is contracted.

Figure 18:
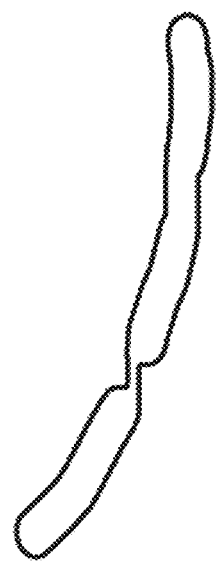
FIG. 18 is a schematic diagram of contour extraction.

FIG. 18 is a result of contour extraction of the expanded and eroded image.

Figure 19:
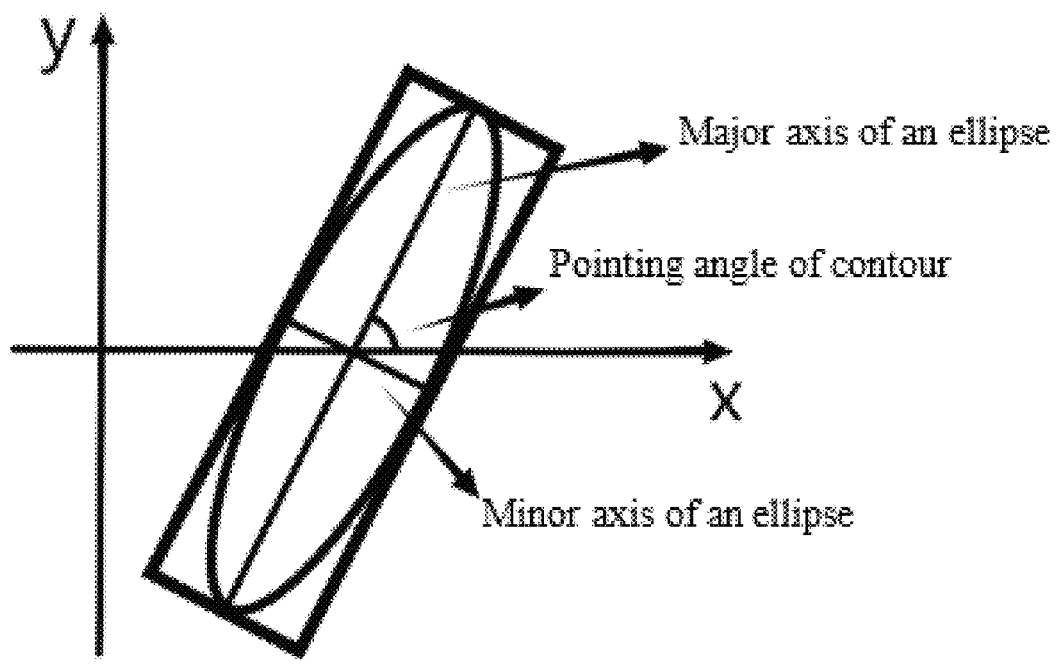
FIG. 19 is a schematic diagram of characteristics of a contour.

As shown in FIG. 19, a rectangular coordinate system is established at a central point of an inscribed ellipse of the merged contour, wherein the angle between the major axis of the inscribed ellipse of the contour and the x-axis is the target angle of direction, and the ratio of the length of the major axis to that of the minor axis of the inscribed ellipse of the contour is the ratio of the major and minor axes.

Figure 20:
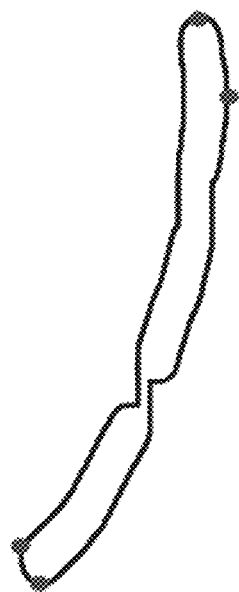
FIG. 20 is a schematic diagram of endpoints of the contour.

As shown in FIG. 20, endpoints, i.e., the points at the uppermost part, the bottommost part, the rightmost side and the leftmost side of each target, are extracted for the target.

Figure 21:
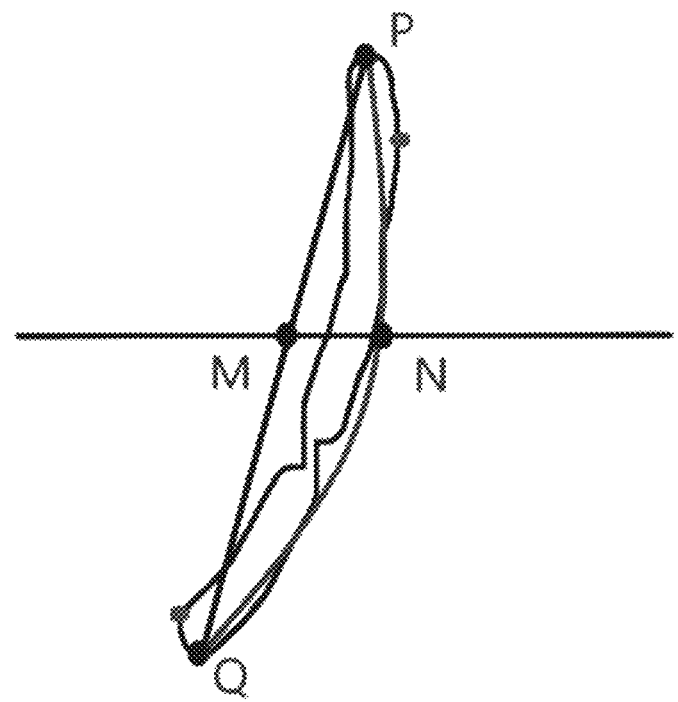
FIG. 21 is a schematic diagram of linear fitting of the endpoints of the contour.

As shown in FIG. 21, the point N, the starting point P and the ending point Q are connected through straight lines, respectively, according to three coordinates of the points P, Q and N, Bezier interpolation is performed on each segment, the straight lines connecting the points are replaced with smooth curves, and the vertexes of the curves are in smooth transition. Finally, a smooth and consecutive curve is formed and drawn to obtain the south trough. Positions of the points P, Q and N are acquired as basic parameters of the trough line.

Figure 22:
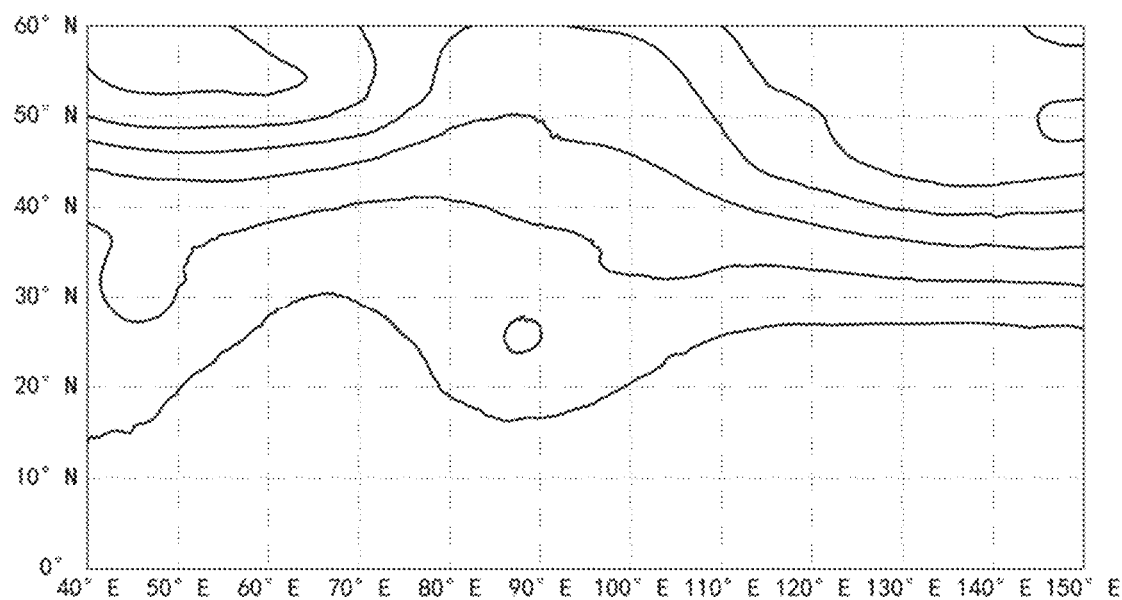
FIG. 22 is a schematic diagram of isolines of a 500 hPa altitude field in an embodiment.

In an embodiment of the present disclosure, for a south trough from $6^{th}$ to 9 Feb. 2021, a 500 hPa geopotential height field at 08:00 on 7 February is taken, with an isoline shown in FIG. 22.

500 hPa geopotential height data in grid data is read, a zonal range is 0°-150° E with 601 grid points, and a meridional range is −20° S-90° E with 441 grid points. The grid resolution is 2.5°×2.5°.

Figure 23:
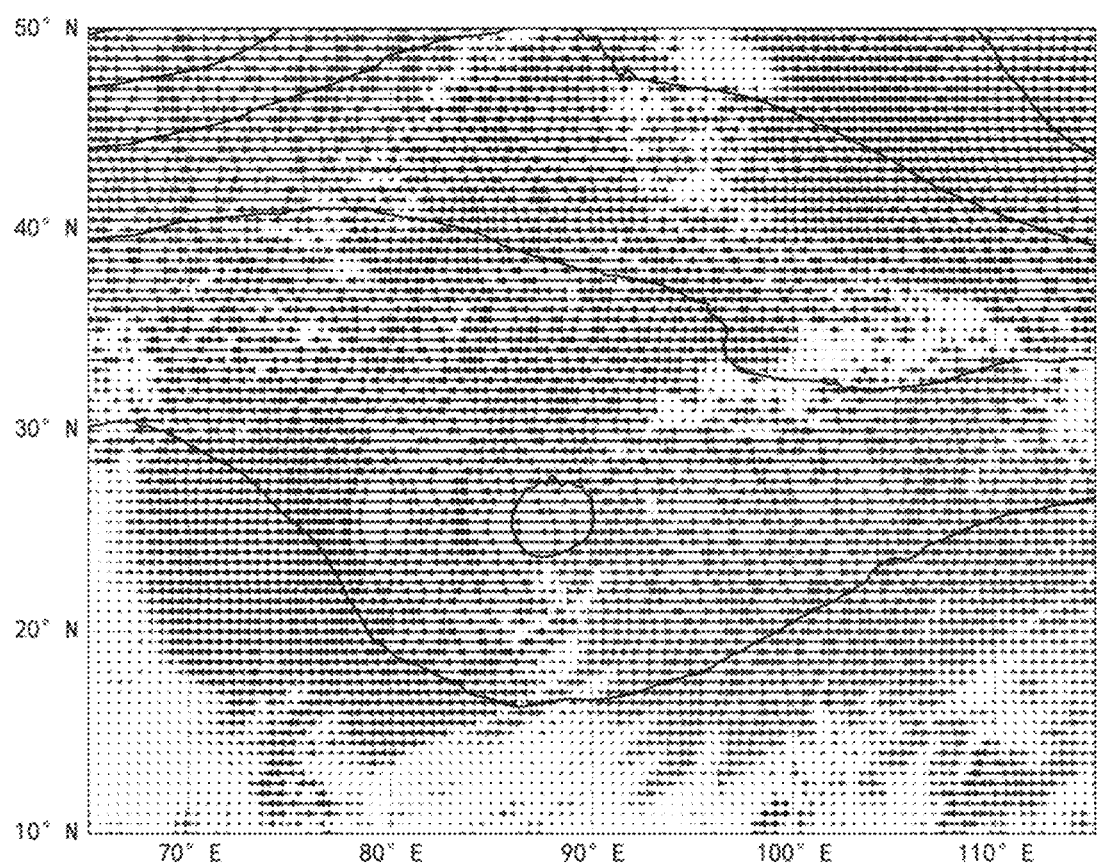
FIG. 23 is a vector diagram of a gradient field in the x direction in an embodiment.
Figure 24:
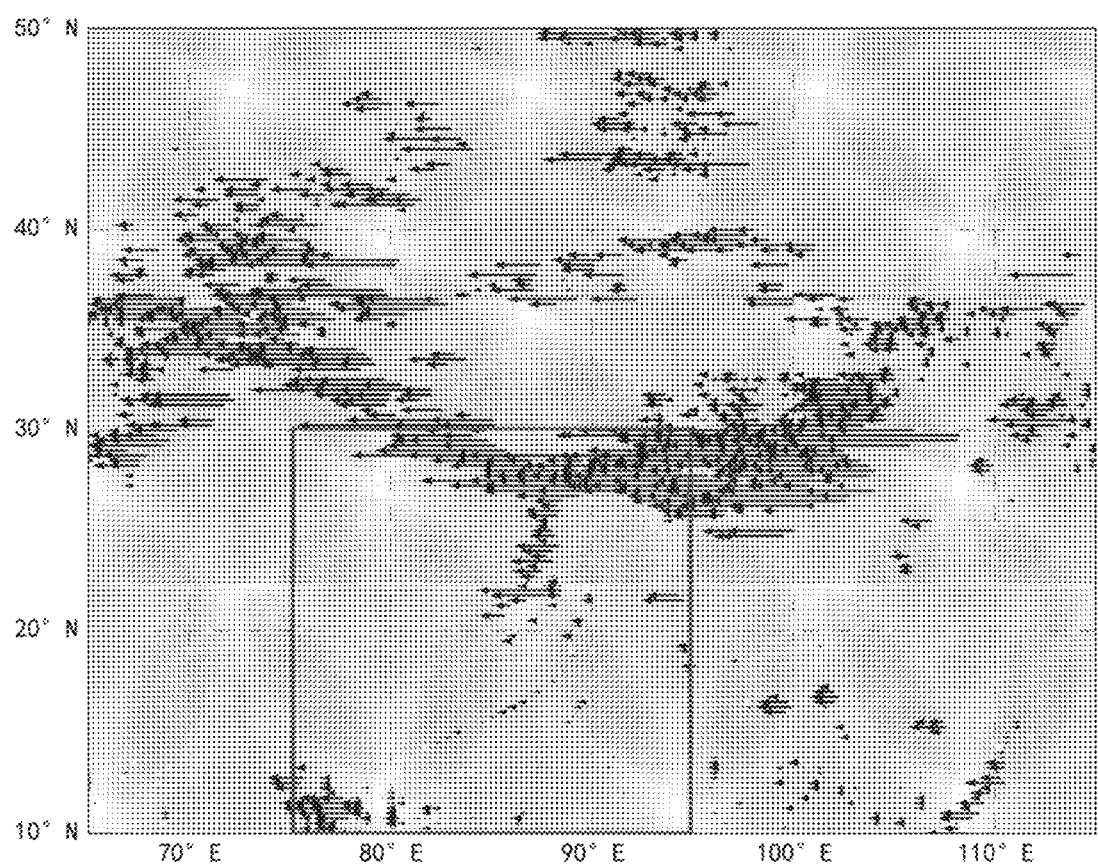
FIG. 24 is a vector diagram of the processed gradient field in an embodiment.

[i,j] represents the element in the $i^{th}$ row and the $j^{th}$ column in the grid data. Grid point on the right side of the grid point [i,j] is represented as [i,j+1], and the distance between the two grid points is represented by Δx. For the data of the point [i,j] and the point [i,j+1] on the right side thereof in the geopotential height field H, the vector diagram of the gradient field $G_x$ in the x direction is calculated, as shown in FIG. 23. As shown in FIG. 24, the turning point where the gradient value turned from being negative to being positive, i.e., the node of the trough line, is searched in the gradient field. For the data of the point [i,j] and the point [i,j+1] on the right side thereof in the gradient field $G_x$, the processed gradient $G'_x$ is calculated, and the corresponding vector diagram is acquired, wherein the intraframe is the range of activity of the south trough.

Figure 25:
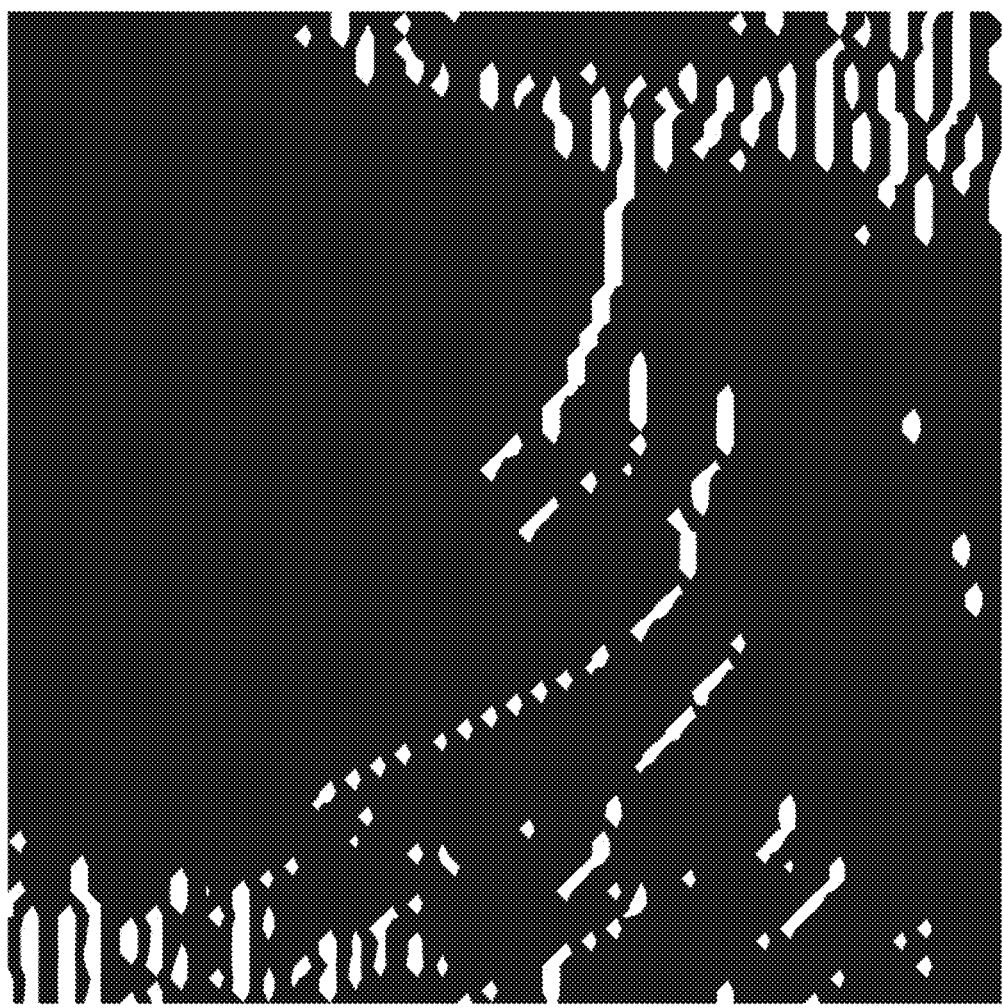
FIG. 25 is a white-and-black diagram of improved Laplace L' in an embodiment.

The divergence of the processed gradient field is calculated to obtain the improved Laplacian numerical value L'. For the data of the point [i,j] and the point [i,j+1] on the right side thereof in the processed gradient field $G'_x$, the improved Laplacian numerical value L' is obtained; and the improved Laplacian numerical value L' for each point is solved and is subjected to 0, 1 binarization processing to obtain the white-and-black image thereof. The region with the improved Laplacian numerical value L' not equal to 0 may be the target region where the trough line may exist, and the grayscale of the region is assigned to 255, and the grayscale of other regions to 0. According to the range of activity of the south trough, the analysis area of L' is defined between 10°-30° N and 75°-95° E, as shown in FIG. 25.

Figure 26:
FIG. 26 is a schematic diagram of expansion in an embodiment.
Figure 27:
FIG. 27 is a schematic diagram of erosion in an embodiment.

As shown in FIG. 26 and FIG. 27, the plurality of targets of potential troughs are merged and are recovered to original dimension. A grayscale map is expanded and eroded, the expanded image is shown in FIG. 26, and the expanded image subjected to erosion is as shown in FIG. 27.

Figure 28:
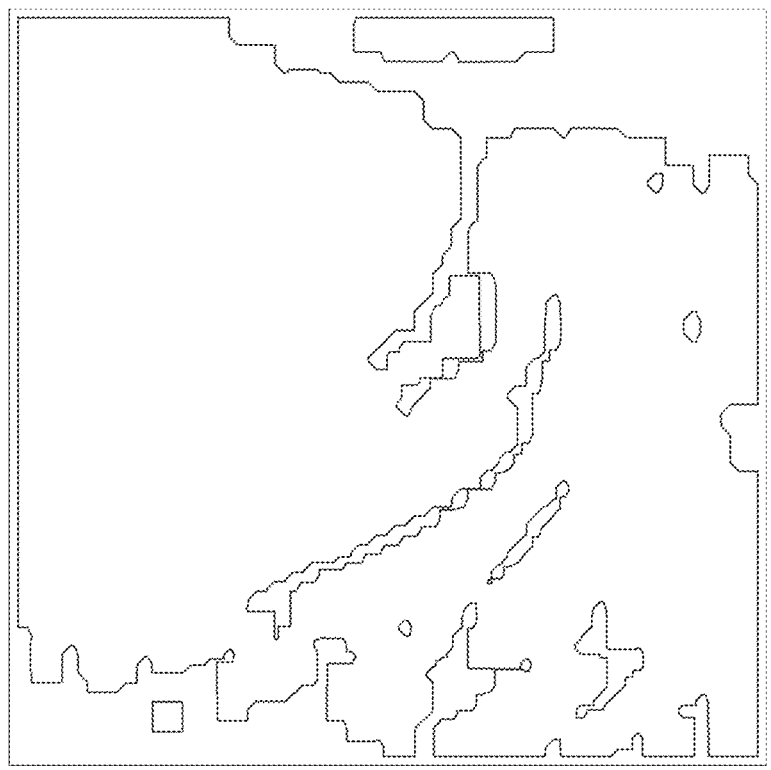
FIG. 28 is a contour extraction diagram in an embodiment.

As shown in FIG. 28, the contour of the expanded and eroded image is extracted to obtain the merged contour.

Figure 29:
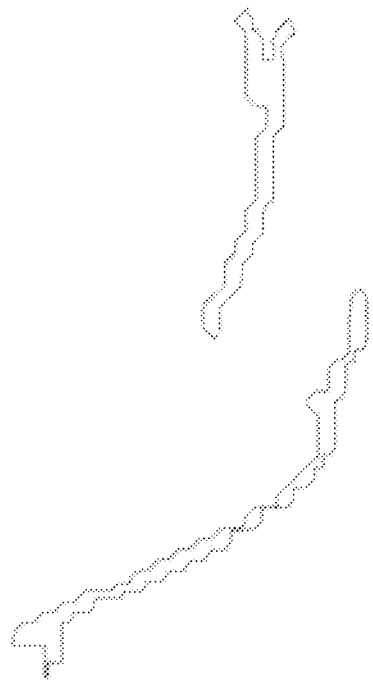
FIG. 29 is a target diagram in an embodiment.

As shown in FIG. 29, the target is searched for the merged contour to obtain the image of the effective target.

Figure 30:
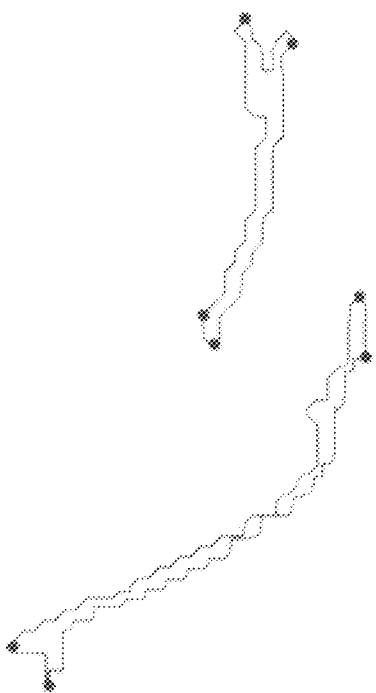
FIG. 30 is a diagram of endpoint positions in an embodiment.

As shown in FIG. 30, the endpoints, i.e., the points at the uppermost part, the bottommost part, the rightmost side and the leftmost side of all targets, are extracted for all targets in the target image.

Figure 31:
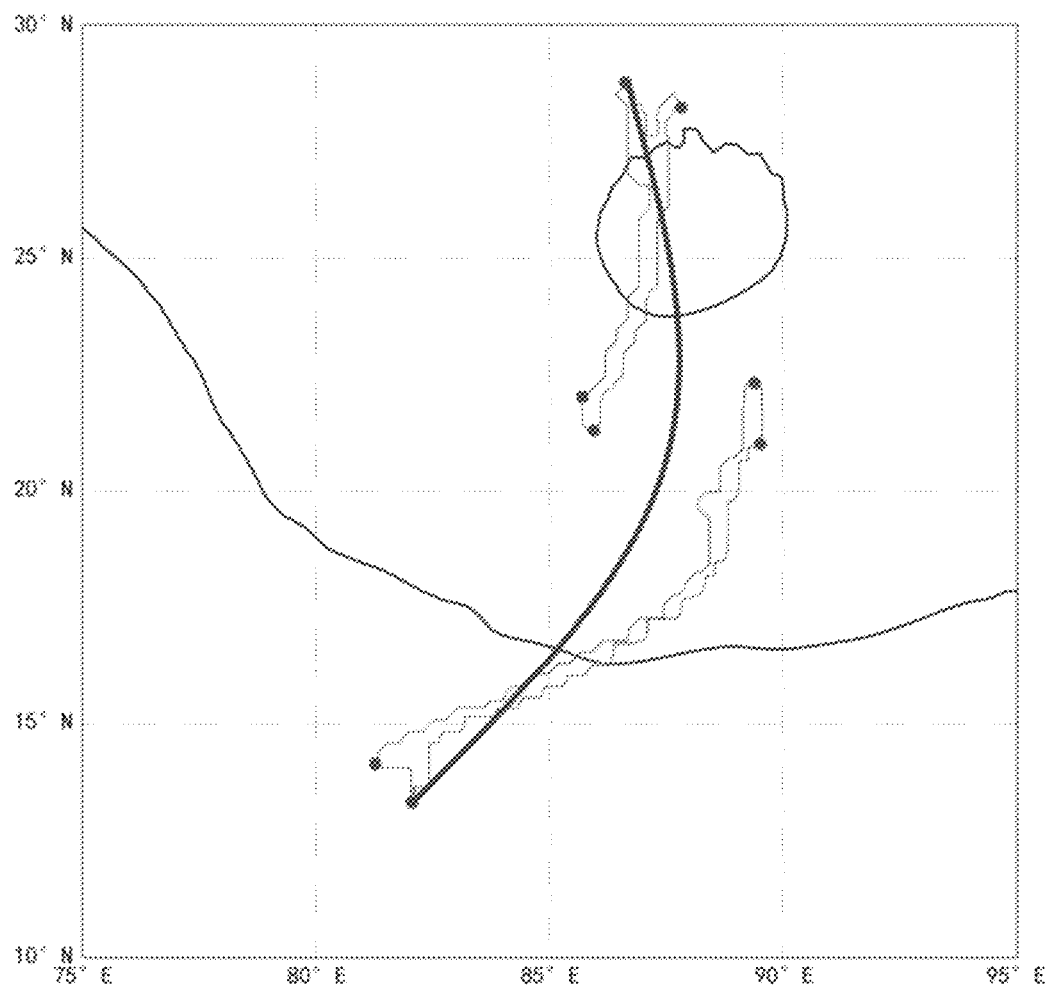
FIG. 31 is a fitting position diagram of a trough line in an embodiment.

A datum point of the trough line is determined according to the characteristic that the trough line is a rightward protruding curve. Trough line fitting is performed, the points P and Q are acquired in a corresponding endpoint location map, and the point N is calculated; the point N, the starting point P and the ending point Q are connected through straight lines, respectively, Bezier interpolation is performed on each segment, the straight lines connecting the points are replaced with smooth curves, and the vertexes of the curves are in smooth transition, so that the smooth and consecutive curve is obtained; when the datum point of the trough line is the points P (86.5° E, 29° N), Q (82.5° E, 17° N) and N (87.5° E, 21° N), and the geopotential height field is 500 hPa, when the south trough appears, a fitting result is that the data points of the trough line acquired from the rightward protruding smooth curve are the points P(86.5° E, 29° N), Q (82.5° E, 17° N) and N (87.5° E, 21° N), i.e., the trough line is a smooth curve passing trough the points P, Q and N and protruding rightwards, as shown in FIG. 31.

The present disclosure can improve the efficiency and normalization for identifying the south trough, greatly reduce the working strength of forecasting staffs and timely make accurate judgment on weather situation, thereby making a contribution to automation of analyzing and forecasting businesses.

What is claimed is:

1. A method for automatically identifying south troughs by Laplace operation, comprising the following steps:
S1: acquiring grid data H of a geopotential height field, wherein H [i, j] represents an element in the $i^{th}$ row and $j^{th}$ column in the grid data, H [i, j+1] represents a grid point on a right side of the H [i, j], Δx represents a distance between the two points: H [i, j] and H [i, j+1]; H [i, j+1] represents a grid point on a lower side of the H [i, j], and Δy represents a distance between the two points: H [i, j] and H [i+1, j];

S2: calculating a gradient field of the grid data H of the geopotential height field in a transverse direction (x direction), specifically comprising:
according to the formula, $$G_x[i,j] = \frac{\Delta H}{\Delta x} = \frac{H[i,j+1] - H[i,j]}{\Delta x}$$

acquiring the gradient field $G_x$ in the x direction, wherein $\Delta H$ represents an altitude difference of the geopotential height field at the $i^{th}$ row and $j^{th}$ column, $\Delta x$ represents the distance between the two points in the x direction; and $G_x[i,j]$ represents a gradient value in the x direction in the $i^{th}$ row and $j^{th}$ column in the grid data;

S3: searching for a turning point where a gradient value turned from being negative to being positive, and cleaning the gradient field to obtain a cleaned gradient field, specifically comprising:

S3-1: determining the turning point where the gradient value turned from being negative to being positive according to the gradient field; and S3-2: reserving data of $G_x<0$ for the point on the left side of the positive and negative turning point of the gradient value; assigning the gradient value of 0 to rest points; and obtaining the cleaned gradient field $G'_x$, with the expression as follows:

$$G'_x[i,j] = \begin{cases} G_x[i,j] (G_x[i,j] < 0 \land G_x[i,j+1] > 0) \\ 0 \end{cases};$$

S4: calculating a divergence of the x direction for the cleaned gradient field to obtain an Laplacian numerical value L', specifically comprising: according to the formula, $$L' = \frac{\Delta G'_x}{\Delta x} = \frac{G'_x[i,j+1] - G'_x[i,j]}{\Delta x}$$

obtaining the Laplacian numerical value L', wherein G'[i, j+1] represents grid data of point on the right side of $G'_x[i,j]$ in the cleaned gradient field;

S5: performing 0,1 binarization processing on the L' to obtain a black-and-white image and a plurality of targets of potential troughs;

S6: merging the plurality of targets of a potential trough line in the black-and-white image by means of an expansion algorithm, thus yielding an expanded image, recovering the expanded image to original scale by means of an erosion algorithm, and identifying a contour through the expanded image after the erosion algorithm to obtain a merged target contour;

S7: calculating a pointing angle of the contour and a ratio of major and minor axes of the contour for the merged target contour, and searching for an effective target;

S8: extracting endpoints of east, west, south and north for the effective target, and adjusting a form of the effective trough line corresponding to the effective target to obtain an adjusted trough line; and S9: fitting the adjusted trough line to obtain a south trough, and applying the south trough to analyze and forecast weather of south China with improved efficiency and normalization for identifying the south trough, thus reducing working strength of forecasting staffs and timely making accurate judgment on weather situation, and making a contribution to automation of analyzing and forecasting businesses, wherein a current of west wind passing through Qinghai-Tibet Plateau is divided into south and north currents, and a south current is called as the south trough with geographic position between latitude 10-30° N and longitude 75-95° E; and the south trough emerges in a middle dekad (ten-day) of October and disappears in a middle dekad of June next year, being a weather system affecting south China, and characteristics of position and intensity of the south trough line being critical indicating significance to weather analysis and forecasting, and the south trough results in cold and rainy weather in a large range of a southwest region in China, and different conditions including position, water vapor delivery, low altitude jets and cold air intensity dominates the precipitation intensity; and the south trough drifts eastwards to bring heavy precipitation to large regions including South China and East China; and wherein obtaining the south trough in the geopotential height field refers to calculating the Laplacian numerical value of the geopotential height field H, searching for the gradient of the geopotential height field by calculating the gradient first, which is equivalent to acquiring the flowing direction of the water drops; and then searching for a low point of the geopotential height by calculating the divergence, which is equivalent to determining the converging position of the water drops, the nodes of the trough line; and a series of such nodes are connected in series to find the trough line.

2. The method for automatically identifying south troughs by Laplace operation according to claim 1, wherein a specific implementation mode of S5 is as follows:
assigning a brightness of a region where the Laplacian numerical value L' is not equal to 0 to 255 and the brightness of other regions to 0, wherein the value of the Laplacian numerical value L' in a target region where the trough line may exist is L'≠0 and the value in other regions is L'=0.

3. The method for automatically identifying south troughs by Laplace operation according to claim 2, wherein a specific implementation mode of S6 is as follows:
S6-1: according to the formula, $$Y_1 = A \oplus B = \{x | B(x) \cap A \neq \emptyset\}$$

expanding the black-and-white image to merge the plurality of targets so as to obtain the expanded image $Y_1$, wherein B represents a convolution mask image, A represents an original image, and x represents an element point in the original image; moving the image B along the element point x, thus yielding a set of obtained points, wherein the set of the obtained points is marked as B(x); B(x) represents a mobile structural element in the image A; $\oplus$ represents an expansion operation; and $\emptyset$ represents a null set;

S6-2: according to the formula, $$Y_2 = Y_1 ! B = \{y | B(y) \in Y_1\}$$

eroding the expanded image to recover the original dimension of the target, so as to obtain an eroded image $Y_2$, wherein ! represents erosion operation, and y represents the element point in the expanded image; and translating the image B according to the element point y, wherein a set of the obtained points is marked as B(y); and S6-3: repeating S6-1 to S6-2 on the black-and-white image for 30 times and identifying the contour of the expanded and eroded image to obtain a merged target contour.

4. The method for automatically identifying south troughs by Laplace operation according to claim 3, wherein a specific implementation mode of S7 is as follows:
- S7-1: establishing a rectangular coordinate system at a central point of an inscribed ellipse of a merged contour, wherein the included angle between the major axis of the inscribed ellipse of the merged contour and the x-axis is a target angle of direction, and the ratio of the length of the major axis to that of the minor axis of the inscribed ellipse of the merged contour is the ratio of the major and minor axes;
- S7-2: reserving contours with an angle of direction being less than 90° and the ratio of the major and minor axes of the inscribed ellipse being greater than 2 in all merged contours as effective targets;
- S7-3: determining whether expansion and erosion times reach 100 times; if the expansion and erosion times reach 100 times, proceeding to S7-4; otherwise, increasing expansion times by 5 times and proceeding to S6;
- S7-4: determining whether the number of the effective targets is 0; if the number of the effective targets is 0, indicating that there is no south trough in the geopotential height field, and finishing determination; otherwise, proceeding to S7-5; and
- S7-5: acquiring all current effective targets.

5. The method for automatically identifying south troughs by Laplace operation according to claim 4, wherein a specific implementation mode of S8 is as follows:
- S8-1: connecting the northernmost point P and the southernmost point Q in all target endpoints to solve a midpoint M;
- S8-2: making a horizontal line through the midpoint M, and taking a point N on a right side of the point M on the horizontal line, i.e., in an operating front of the trough line; and
- S8-3: letting a distance |MN| between the point M and the point N be ⅕ of a distance |PQ| between the point P and the point Q to obtain an optimal form of the target trough line, so as to obtain the adjusted trough line.

6. The method for automatically identifying south troughs by Laplace operation according to claim 5, wherein a specific implementation mode of S9 is as follows:
- S9-1: respectively connecting the points N and P and the points N and Q for the adjusted trough line with straight lines; and
- S9-2: performing Bezier interpolation on each straight line, and replacing the straight line connecting the points with a smooth curve to form a smooth and consecutive curve, i.e., the south trough.

* * * * *